(12) United States Patent
Liu

(10) Patent No.: US 12,738,842 B2
(45) Date of Patent: Sep. 15, 2026

(54) PFM MODE OPERATION OF SWITCHED CAPACITOR CONVERTERS

(71) Applicant: Halo Microelectronics International, Campbell, CA (US)

(72) Inventor: Rui Liu, Fremont, CA (US)

(73) Assignee: Halo Microelectronics International, Campbell, CA (US)

( * ) Notice: Subject to any disclaimer, the term of this patent is extended or adjusted under 35 U.S.C. 154(b) by 188 days.

(21) Appl. No.: 18/783,812

(22) Filed: Jul. 25, 2024

(65) Prior Publication Data

US 2024/0380319 A1 Nov. 14, 2024

Related U.S. Application Data

(62) Division of application No. 17/531,341, filed on Nov. 19, 2021, now Pat. No. 12,081,119.

(51) Int. Cl.

*H02M 3/07* (2006.01)
*H02M 1/00* (2006.01)
*H02M 3/158* (2006.01)

(52) U.S. Cl.

CPC ........... *H02M 3/07* (2013.01); *H02M 1/0003* (2021.05); *H02M 1/0032* (2021.05); *H02M 3/158* (2013.01)

(58) Field of Classification Search

CPC ...... H02M 3/07; H02M 3/158; H02M 1/0032; H02M 7/4837

See application file for complete search history.

(56) References Cited

U.S. PATENT DOCUMENTS

2023/0024198 A1* 1/2023 Kawano ............. H02M 1/0058

* cited by examiner

*Primary Examiner* — Alex Torres-Rivera
(74) *Attorney, Agent, or Firm* — AP3 Law Firm PLLC

(57) ABSTRACT

A control circuit is configured to control a switched capacitor converter to operate in a pulse frequency modulation (PFM) mode. The control circuit includes a one-shot circuitry configured to generate a one-shot pulse to drive the switched capacitor converter to operate in the PFM mode. A PFM mode comparator is coupled to the one-shot circuitry, and is configured to trigger, based on an output voltage of the switched capacitor converter, the one-shot circuitry to generate the one-shot pulse. The switched capacitor converter may be controlled to exit or continue the PFM mode operation based on a trailing current flowing through a flying capacitor of the switched capacitor converter, an output current of the switched capacitor converter, a time interval of charging the flying capacitor, or a PFM switching period of the switched capacitor converter operating in the PFM mode. Corresponding controlling methods are also provided.

12 Claims, 14 Drawing Sheets

PFM MODE OPERATION OF SWITCHED CAPACITOR CONVERTERS

CROSS-REFERENCE TO RELATED APPLICATION

This application is a divisional of U.S. patent application Ser. No. 17/531,341, filed on Nov. 19, 2021 and entitled "PFM MODE OPERATION OF SWITCHED CAPACITOR CONVERTERS," which is incorporated by reference herein as if reproduced in its entirety.

TECHNICAL FIELD

The present disclosure relates, generally, to DC/DC conversion system, and more specifically, to techniques and mechanisms for pulse frequency modulation (PFM) mode operation of switched capacitor converters.

BACKGROUND

As technologies further advance, a variety of portable devices, such as mobile phones, tablet PCs, digital cameras, MP3 players and/or the like, have become popular. Each portable device may employ a plurality of rechargeable battery cells. The plurality of rechargeable battery cells may be connected in series or in parallel so as to form a rechargeable battery pack for storing electrical energy.

Battery chargers are employed to restore energy to the plurality of rechargeable battery cells. The battery charger is controlled to provide voltage (e.g., a constant voltage charging mode) and current (e.g., a constant current charging mode) to the plurality of rechargeable battery cells so as to restore energy to the battery.

As power consumption has become more important, there may be a need for reducing the length of time to charge the battery. Fast charging has emerged as a veritable solution to satisfy the ever-changing demand from consumers. In a fast charging system, a switched capacitor converter is employed to deliver high current to the battery while keeping the input current (e.g., USB cable current) low. The switched capacitor converter has various advantages such as monolithic integration of the converter without external inductors, high power conversion efficiency and the like. The switched capacitor converter is capable of achieving a safe and quick charging of large-capacity batteries.

Modern smartphones often require large capacity battery to achieve the desired operation time between battery charges. Recent development in battery fast charging technologies has encountered challenges in reducing the excessive power dissipation resulting from the large input current when a single cell battery is directly charged. The large input current also requires customized universal serial bus (USB) connectors, adding additional system cost. Dual cell battery connected in series can resolve the large input current issue with its doubled battery voltage at the same capacity, and consequently, reduces the large amount of power dissipations associated with the large input current and enables the use of standard USB connectors.

Presently, most switched capacitor direct current to direct current (DCDC or DC/DC) converters are employed in single-cell battery systems and operate in open-loop for achieving fast charging the battery at high operating efficiency. A closed-loop operation, in particular, a pulse frequency modulation (PFM) operation, has not been considered in switched capacitor DCDC converters due to the fact that such switched capacitor DCDC converters in operation require presence of an appropriate USB adaptor. Therefore, using a PFM operation to reduce power consumption of a switched capacitor DCDC converter and to maintain high efficiency at light load conditions has not been brought up. Further, a switched capacitor DCDC converter in a dual-cell battery system operates when only battery power is available. In this case, if the system load is very light, the high quiescent current required by an open-loop operation of the switched capacitor DCDC converter consumes unnecessary battery power and thus reduces the battery life. Therefore, it is desirable that the switched capacitor DCDC converter can operate in the PFM mode at light load in order to extend battery life. The switched capacitor converter in the PFM mode operation can enable the energy star power saving mode even with a single-cell battery system when a battery is fully charged and a USB adaptor remains unplugged. It is also desirable to provide a control method that can control the switched capacitor DCDC converter to operate in the PFM mode such that the switched capacitor DCDC converter consumes very small quiescent power to maintain its operation and meanwhile maintains its output voltage in a valid range.

SUMMARY

Technical advantages are generally achieved, by embodiments of this disclosure which describe a pulse frequency modulation (PFM) mode operation of switched capacitor converters.

According to an aspect of the present disclosure, a circuit is provided that includes: a switched capacitor converter, and a control circuit configured to control the switched capacitor converter to operate in a pulse frequency modulation (PFM) mode. The control circuit includes: a one-shot circuitry coupled to the switched capacitor converter and configured to generate a one-shot pulse to drive the switched capacitor converter to operate in the PFM mode; and a PFM mode comparator coupled to the one-shot circuitry, and configured to trigger, based on an output voltage at an output node of the switched capacitor converter, the one-shot circuitry to generate the one-shot pulse.

According to another aspect of the present disclosure, a method is provided that includes: detecting whether a trailing current flowing through a flying capacitor of a switched capacitor converter exceeds a threshold, wherein the flying capacitor is coupled between a first common node of first two switches of the switched capacitor converter and a second common node of second two switches of the switched capacitor converter, and the first two switches and the second two switches are connected in series. The method further includes: when the trailing current flowing through the flying capacitor does not exceed the threshold, controlling the switched capacitor converter to continue operating in a pulse frequency modulation (PFM) mode; and when the trailing current flowing through the flying capacitor exceeds the threshold, controlling the switched capacitor converter to switch from operating in the PFM mode to operating in an open-loop mode.

According to another aspect of the present disclosure, a method is provided that includes detecting whether an output current of a switched capacitor converter exceeds a threshold. The method further includes: when the output current of the switched capacitor converter does not exceed the threshold, controlling the switched capacitor converter to continue operating in a pulse frequency modulation (PFM) mode; and when the output current of the switched capacitor converter exceeds the threshold, controlling the switched capacitor converter to switch from operating in the PFM mode to operating in an open-loop mode.

According to another aspect of the present disclosure, a method is provided that includes: detecting whether a time interval for charging a flying capacitor of a switched capacitor converter is less than a threshold, wherein the flying capacitor is coupled between a first common node of first two switches of the switched capacitor converter and a second common node of second two switches of the switched capacitor converter, and the first two switches and the second two switches are connected in series, and wherein the switched capacitor converter is operating in a pulse frequency modulation (PFM) mode. The method further includes: when the time interval for charging the flying capacitor is less than the threshold, controlling the switched capacitor converter to exit the PFM mode and to operate in an open-loop mode; and when the time interval for charging the flying capacitor is not less than the threshold, controlling the switched capacitor converter to continue operating in the PFM mode.

According to another aspect of the present disclosure, a method is provided that includes detecting whether a PFM switching period of a switched capacitor converter exceeds a threshold. The method further includes: when the PFM switching period of the switched capacitor converter is not less than the threshold, controlling the switched capacitor converter to continue operating in a pulse frequency modulation (PFM) mode; and when the PFM switching period of the switched capacitor converter is less than the threshold, controlling the switched capacitor converter to switch from operating in the PFM mode to operating in an open-loop mode.

Advantages of the aspects of the present disclosure include reduced quiescent current of a switched capacitor converter when operating at light load or no load conditions, increased light load efficiency of the switched capacitor converter, controllable output ripple voltage amplitude of the switched capacitor converter, as well as controllable output voltage levels of the switched capacitor converter.

The foregoing has outlined, rather broadly, preferred, and alternative features of embodiments of the present invention so that those skilled in the art may better understand the detailed description of embodiments of the invention that follows. Additional features of the embodiments of the invention will be described hereinafter that form the subject of the claims of the invention. Those skilled in the art should appreciate that they can readily use the disclosed conception and specific embodiments as a basis for designing or modifying other structures for carrying out the same purposes of the present disclosure. Those skilled in the art should also realize that such equivalent constructions do not depart from the spirit and scope of the invention in its broadest form.

BRIEF DESCRIPTION OF THE DRAWINGS

For more complete understanding of the present invention, reference now is made to the following descriptions in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

As discussed above, directly charging a single cell battery may require a large input current to fast charge the single cell battery. The large input current may cause excessive power dissipation in the current path, and also may require customized universal serial bus (USB) connectors when the direct charging current exceeds 5A. A dual cell (or dual-cell) battery connected in series may be used to solve the problem at the same battery size.

Figure 1:
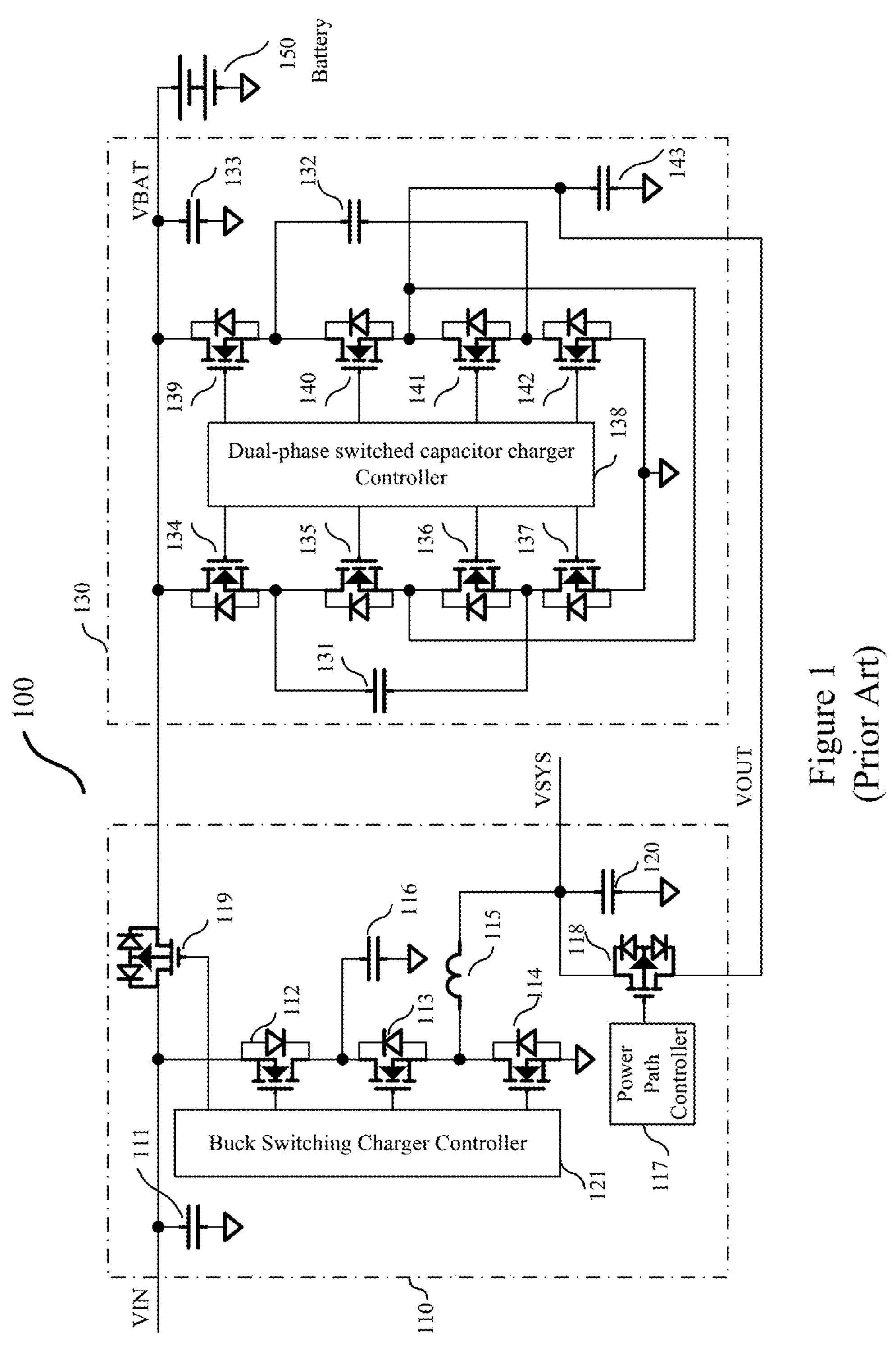
FIG. 1 illustrates a diagram of an example dual-cell battery based charging system in the art.

FIG. 1 is a diagram illustrating an example dual-cell battery based charging system 100 in the art. The system 100 in FIG. 1 includes two subsystems 110 and 130 connected between a first voltage bus VIN (connected to a power source VIN) and a second voltage bus VBAT.

The subsystem 110 includes a power switch 112, a back to back power switch 119, a buck converter (also referred to as a buck switching converter) including power switches 113 and 114, an output inductor 115, an input capacitor (also referred to as an input filtering capacitor) 116, and an output capacitor 120. The power switches 112-114 are connected in series between the first voltage bus VIN and ground. The output inductor 115 is connected between a common node of the power switches 113 and 114 and ground through the output capacitor 120. The input capacitor 116 is connected between a common node of switches 112 and 113 and ground. A capacitor 111 is connected between the first voltage bus VIN and ground. The first voltage bus VIN is coupled to the second voltage bus VBAT through the power switch 119. The output of the buck converter provides a valid voltage to the system loads.

The subsystem 110 further includes a controller block (buck switching charger controller) 121 that generates gate driving signals for the power switches 112, 113, 114, and 119, a power path controller 117, and a power path switch 118. The power path controller 117 generates gate driving signals for the power path switch 118. The power path switch 118 is coupled between a system voltage bus VSYS and a third voltage bus VOUT. The system voltage bus VSYS is connected to a plurality of system loads (such as loads of a mobile device, e.g., a mobile phone, a pad, a laptop, etc.).

The switch 118 is implemented as an isolation switch. In particular, the switch 118 provides isolation between the third voltage bus VOUT and the system voltage bus VSYS. As shown in FIG. 1, the bulk terminal of the switch 118 is not connected to the source of the switch 118. The switch 118 includes two diodes. A first diode is between the bulk terminal and the source of the switch 118. A second diode is between the bulk terminal and the drain of the switch 118. These two diodes are back-to-back connected as shown in FIG. 1. As a result of having the back-to-back connected diodes, the switch 118 functions as the isolation switch. The switch 118 is employed to connect the third voltage bus VOUT to the subsystem 110 or disconnect the third voltage bus VOUT from the subsystem 110.

Respective first terminals of the power switches 112 and 119 are connected to the first voltage bus VIN. A second terminal of the power switch 112 is connected to an input of the buck converter and the input filtering capacitor 116. A second terminal of the power switch 119 is connected to the second voltage bus VBAT. The power switch 119 is also implemented as an isolation switch by including two back-to-back connected diodes. As shown, a first diode is between the bulk terminal and the source of the switch 119, and a second diode is between the bulk terminal and the drain of the switch 119.

The subsystem 130 is a switched capacitor DCDC converter (also referred to thereafter as a switched capacitor converter), implemented as a dual-phase switched capacitor converter. The subsystem 130 includes power switches 134, 135, 136, 137, 139, 140, 141, 142, two flying capacitors 131 and 132, filtering capacitors 133 and 143, and a dual-phase switched capacitor charger controller 138 that generates gate driving signals for the power switches 134-137 and 139-142 of the switched capacitor converter.

The power switches 134, 135, 136, 137 are connected in series between the second voltage bus VBAT and ground. The flying capacitor 131 is coupled between a common node of the power switches 134 and 135 and a common node of the power switches 136 and 137. A common node of the power switches 135 and 136 is connected to a common node of the power switches 140 and 141. The common node of the power switches 140 and 141 is coupled to the third voltage bus VOUT.

The power switches 139, 140, 141, 142 are connected in series between the second voltage bus VBAT and ground. The flying capacitor 132 is coupled between a common node of the power switches 139 and 140 and a common node of the power switches 141 and 142. The filtering capacitor 133 is coupled between the second voltage bus VBAT and ground. The filtering capacitor 143 is coupled between the third voltage bus VOUT and ground. VBAT is the input of the switched capacitor converter and is connected to a dual-cell battery 150.

For a mobile device, such as a smart phone, the system supply voltage for system loads may range from 3.5V to 4.5V. The switched capacitor converter 130 has two functions: (1) operating in 2:1 charge pump mode to step down the battery voltage (of the dual-cell battery 150) to supply power to the system loads via VSYS, and (2) operating in 1:2 reverse charge pump mode to charge the dual-cell battery 150 when a valid power supply is present at the first voltage bus VIN. When a valid power supply is present at the first voltage bus VIN, the subsystem 110 may operate to provide appropriate power supply to the system loads via VSYS and to charge the dual-cell battery 150. When a valid high voltage fast charging adaptor, such as a USB PD3.0, presents at the VIN bus, the power switch 119 is turned on to fast charge the dual-cell battery 150 directly. Meanwhile the switched capacitor converter 130 operates in 2:1 charge pump mode to supply the power of the dual-cell battery 150 to VSYS through the power path switch 118. If there is valid power supply present at the VIN bus, the switched capacitor converter 130 also operates in 2:1 charge pump mode to supply the power of the dual-cell battery 150 to VSYS through the power path switch 118. Thus, the switched capacitor converter 130 always operates regardless whether a valid power supply presents at the VIN bus or not. The switched capacitor converter 130 can operate in either 2:1 charge pump mode or 1:2 reverse charge pump mode depending on the type of the USB adaptor presenting at the VIN bus or whether there is only battery power in the system 100.

Conventionally, the switched capacitor converter 130 in FIG. 1 is mainly operated in open-loop at 50% duty to obtain the highest efficiency at heavy load conditions and simplify the control circuit design. Although the control scheme is simple for open-loop operation, clock must be generated to produce a constant operation frequency and a 50% duty cycle. To achieve high efficiency and minimize the size of the flying capacitor, the operation frequency is between 1 MHz and 2 MHz when used for dual-cell battery operation. In operation, the clock circuit consumes some current; and further, every time when the power switches are turned on or off, there is a certain amount of energy loss. For example, if MOSFETs are used for the power switches, the gate capacitance and miller capacitance of a MOSFET result in switching loss of the MOSFET, which may be represented by 0.5*(Cgs*Vgs^2+Cds*Vds^2)*fs, where fs is the operation frequency, Cgs is capacitance of a capacitor between the gate and source of the MOSFET, Cds is capacitance of a capacitor between the drain and source of the MOSFET, Vgs is the amplitude of the gate drive voltage, and Vds is the voltage across the drain and source of the MOSFET when it is in off state. Regardless whether there is output load current or not, such switching loss exists every time when the MOSFET is turned on or off. Therefore, the switching loss at light load or no load condition can be dominant of the total input power to the switched capacitor converter due to the high frequency operation in open-loop mode of the switched capacitor converter.

One solution is to reduce the operation frequency of the switched capacitor converter in order to reduce the switching loss when output load current decreases (i.e., when the system loads decrease). However, simply reducing the operation frequency based on the output load current while having the clock circuit running still consumes large quiescent current, and there is no guarantee on the peak to peak output ripple voltage specification. Further, the output voltage VOUT may fluctuate largely due the open-loop operation. It is desirable to maintain the output voltage at a regulated value at light load, keep the output ripple voltage within a pre-determined specification, and eliminate the clock circuit to further reduce the quiescent current.

Embodiments of the present disclosure provide systems and methods that can address the previously discussed issues. The embodiments are provided for operating a switched capacitor DCDC converter in the PMF mode. The embodiments do not require a clock circuit, and consumes very small amount of quiescent power when there is very light load or no load, compared with conventional switched capacitor DCDC converter in the open-loop operation. Such low quiescent power consumption extends batteries' life in mobile devices, and increases the light load efficiency. Embodiment control methods and circuits are provided to control the switched capacitor DCDC converter to operate in the low power consumption mode when its output load current is low (light load or no load).

Figure 2:
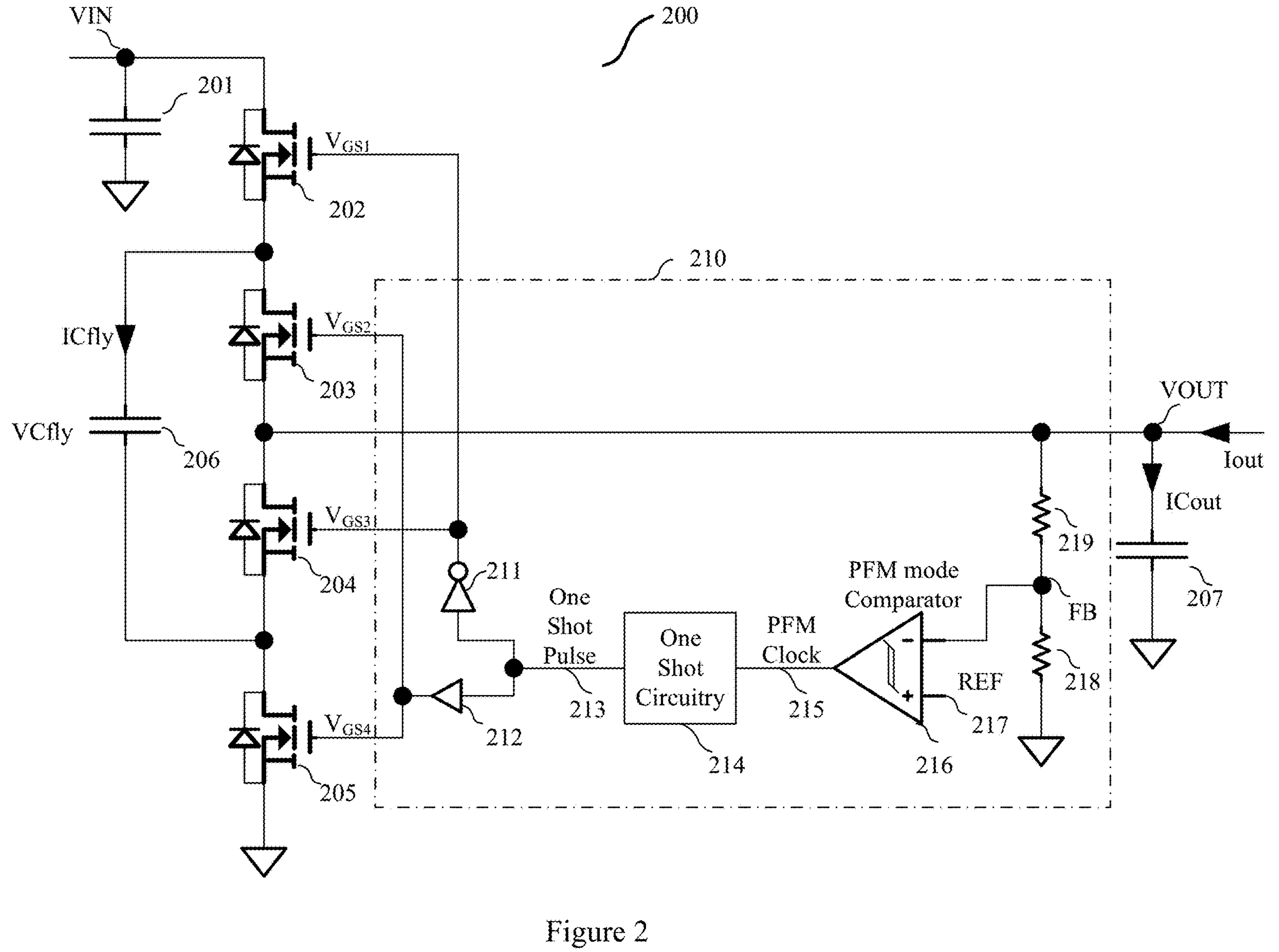
FIG. 2 illustrates a diagram of a circuit, highlighting a control circuit controlling pulse frequency modulation (PFM) mode operation of a single-phase switched capacitor converter, according to various embodiments of the present disclosure.

FIG. 2 illustrates a diagram of an embodiment circuit 200, highlighting a control circuit configured to control a single-phase switched capacitor converter to operate in the PFM mode. The circuit 200 includes a single phase switched capacitor converter operable in the PFM mode, which reduces the quiescent current and increases the light load efficiencies of the single phase switched capacitor converter. The single-phase switched capacitor converter is used here to merely illustrate example operations of an embodiment of the present disclosure. It is readily apparent for those of ordinary skill in the art that the embodiments may also be applied to dual-phase switched capacitor converters.

As shown, the single-phase switched capacitor converter includes filtering capacitors 201 and 207, power switches 202, 203, 204, 205, a flying capacitor 206, and a PFM mode operation control block 210 (which is also referred as a control circuit or subsystem 210). The subsystem 210 generates driving signals for the power switches 202, 203, 204, 205 of the single-phase switched capacitor converter.

The power switches 202, 203, 204, and 205 are connected in series between a first voltage bus VIN and ground. The first voltage bus VIN is coupled to a power source VIN. The filtering capacitor 201 is coupled between the first voltage bus VIN (or input voltage node VIN) and ground. The (output) filtering capacitor 207 is coupled between a second voltage bus VOUT (or output voltage node VOUT) and ground. The VOUT may be viewed as an output voltage of the single-phase switched capacitor converter, and may supply power to system loads via a system bus VSYS (as the one shown in FIG. 1). The flying capacitor 206 is coupled between a common node of the power switches 202 and 203 and a common node of the power switches 204 and 205. A common node of the power switches 203 and 204 is connected to the second voltage bus VOUT.

The subsystem 210 is configured to control the PFM mode operation of the single-phase switched capacitor converter. As shown, the subsystem 210 includes an output feedback resistor divider including two resistors 218 and 219, a PFM mode comparator 216, a one-shot block (or circuitry) 214, a non-inverting buffer 212, and an inverting buffer 211.

The resistors 218 and 219 are connected in series between the second voltage bus VOUT and ground. A common node FB of the resistors 218 and 219 is connected to a first input terminal of the PFM mode comparator 216, providing an input voltage to the PFM mode comparator 216. Thus, the voltage at the first input terminal of the PFM mode comparator 216 varies with the output voltage VOUT of the switched capacitor converter. Note that the output feedback resistor divider illustrated in FIG. 2 is merely used as an example. Those of ordinary skill in the art would recognize many variations, alternatives and embodiments that can be used for the same purpose of the output feedback resistor divider in the example of FIG. 2.

A second input terminal of the PFM mode comparator 216 is connected to a reference node having a reference voltage (REF) 217. The PFM mode comparator 216 generates a PFM clock signal 215 based on the input voltage at node FB and the reference voltage 217, and feeds the PFM clock 215 to the one-shot block 214. When the voltage at the node FB is equal to the REF voltage 217, the PFM mode comparator 216 generates the PFM clock signal 215.

An input terminal of the one-shot block 214 is connected to an output terminal of the PFM mode comparator 216. An output terminal of the one-shot block 214 is connected to the non-inverting buffer 212 and the inverting buffer 211. Triggered by the PFM clock 215, the one-shot block 214 generates a one shot (or one-shot) pulse 213 having a predetermined pulse width. The one-shot circuit 214 then returns to its stable state and produces no more output until it is triggered again.

The inverting buffer 211 is connected to respective terminals (gates) of the power switches 202 and 204. The non-inverting buffer 212 is connected to respective terminals (gates) of the power switches 203 and 205. The output of the non-inverting buffer 212 drives the power switches 203 and 205. The output of the inverting buffer 211 drives the power switches 202 and 204. Note that the buffers 211 and 212 illustrated in FIG. 2 are merely used as an example. Those of ordinary skill in the art would recognize many variations, alternatives and embodiments that can be used for the same purpose of utilizing the inverting buffer 211 and the non-inverting buffer 212 in the example of FIG. 2.

In operation, as an example, the power switches 202 and 204 may initially be turned on and the power switches 203 and 205 are turned off. In this case, the flying capacitor 206 is connected between the input voltage node VIN and the output voltage node VOUT via the power switches 202 and 204. The output load current Iout at the output voltage node VOUT is supplied by both the input power source VIN through the flying capacitor 206 and the energy stored in the output filtering capacitor 207. During the time interval when the power switches 202 and 204 are on and the power switches 203 and 205 are off (referred to as a "first time interval" for the convenience of illustration), the output voltage VOUT is being discharged by a portion of the output load current Iout, and the voltage VCfly across the flying capacitor 206 is charged by a portion of the output load current Iout. The sum of the currents through the flying capacitor 206 and the output filtering capacitor 207 (i.e., ICfly+ICout) equals the output load current Iout. The ratio of the flying capacitor current ICfly of the flying capacitor 206 over the output filtering capacitor current ICout of the output filtering capacitor 207 is equal to the ratio of the capacitance of the output filtering capacitor 207 (represented as C207 or Cout) over the capacitance of the flying capacitor 206 (represented as C206 or Cfly), i.e., ICfly/ICout=C207/C206.

Since the output load current Iout is constant during this first time interval, the voltage VCfly across the flying capacitor 206 increases linearly, and the output voltage VOUT decreases linearly at the same rate as VCfly. When the output voltage VOUT decreases such that the voltage at the node FB (input voltage to the PFM mode comparator 216) reaches (equals) the reference voltage REF 217, the PFM mode comparator 216 generates the PFM clock 215 to enable (trigger) the one-shot block 214. The reference voltage REF 217 may be set to half of the input voltage VIN or any other value that is less than half of the input voltage.

Triggered by the PFM clock 215, the one-short block 214 produces the single pulse (one-shot pulse) 213 having a pre-determined pulse width. The single pulse 213 may then turn off the power switches 202 and 204 through the inverting buffer 211 and turn on the power switches 203 and 205 through the non-inverting buffer 212. During the time interval of the one-shot pulse width (referred to thereafter as a “second time interval”), the energy stored in the flying capacitor 206 is delivered (discharged) to the output capacitor 207, resulting in fast increase in the output voltage VOUT. The current ICfly of the flying capacitor 206 is determined by the output ripple voltage divided by path resistance, which includes on-resistance of the power switches 203 and 205 and trace resistance. Since the path resistance is small, e.g., about 20 to 25 ml in general, the current ICfly of the flying capacitor 206 during this second time interval is much larger than the output load current Iout. For example, with 50 mV output voltage VOUT, the current ICfly of the flying capacitor 206 can be 2A to 2.5A, compared to light load current which is normally less than 500 mA.

The pulse width of the one-shot pulse 213 may determine the magnitude of the output ripple voltage. The width of the one-shot pulse 213 may be determined from the path resistance and the output ripple voltage specifications. When the one-shot pulse 213 expires, the power switches 203 and 205 are turned off and the power switches 202 and 204 are turned on again. The cycle then repeats, and the circuit 200 operates similarly as described above. The subsystem 210 is configured to control the single-phase switched capacitor converter to operate in the PFM mode, e.g., by providing drive signals to drive the single-phase switched capacitor converter to work in the PFM mode.

Note that the voltage charging rate of the flying capacitor 206 is the same as the discharging rate of the output voltage VOUT. Therefore, when the output load current Iout increases, the output voltage discharging rate increases and the voltage charging rate of the flying capacitor 206 increases. As a result, the voltage at the node FB reaches (decreases to) the REF voltage 217 faster, the one-shot pulse 213 is triggered more frequently, and the PFM operation frequency increases as the one-shot pulse width is constant. When the PFM operation frequency increases to a pre-determined value or the output load current increase to a pre-determined value, the PFM mode operation may be terminated (or disabled), and the single-phase switched capacitor converter enters the open-loop mode operation to meet the demand for large output load current, which is beyond the capability of the PFM mode operation. It should be noted that the output voltage VOUT may need to be regulated to be a value higher than a value when the switched capacitor converter operates in open-loop mode under heavy load conditions, to achieve good load transient response.

In general, the PFM mode comparator 216 consumes about 1 to 2 uA current. The one shot block 214 consumes about 1 uA current. The buffers 211 and 212 consume less than 1 uA current. Thus, the current consumption by the subsystem 210 is about less than 5 uA. The subsystem 210 does not include a clock block and the operating frequency is solely determined by the output load current. This means that there is no need to design a circuit function block to change the PFM operation frequency according the output load current, which in turn means that there is no need to detect the output load current accurately.

Figure 3:
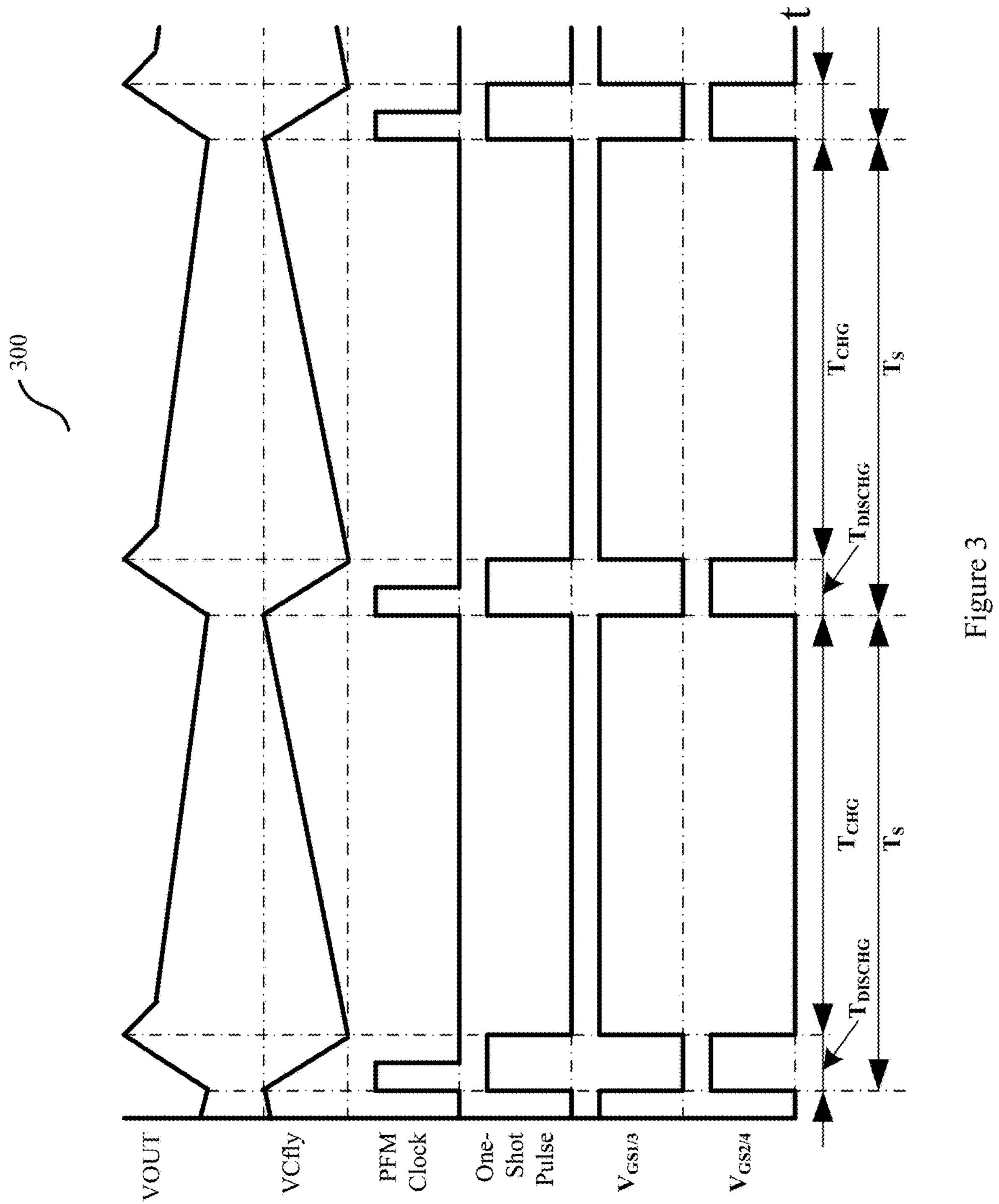
FIG. 3 is a diagram illustrating waveforms of the circuit in FIG. 2.

FIG. 3 is a diagram 300 showing embodiment waveforms of the circuit 200 in FIG. 2. FIG. 3 shows waveforms of the output voltage VOUT, the voltage VCfly across the flying capacitor 206, the PFM clock 215, the one-shot pulse 213, a voltage $V_{Gs1/3}$ at the gate of the power switch 202 or 204, and a voltage $V_{GS2/4}$ at the gate of power the switch 203 or 205. FIG. 3 shows the waveforms in two cycles (each cycle corresponds to a period Ts). In this example, a cycle (having a period Ts) is from the time when the one-shot pulse is triggered to the time when the next one-shot pulse is trigger. The cycle period Ts may also be referred to as a PFM switching period.

As shown, during a charging period $T_{CHG}$ (which corresponds to the first time interval described above, where the power switches 202 and 204 are on and the power switches 203 and 205 are off), VOUT decreases as the output load current Iout discharges the output capacitor 207, and the voltage VCfly across the flying capacitor 206 increases because the sum of the output voltage and the flying capacitor voltage is equal to the input voltage during this time interval $T_{CHG}$. During the period $T_{CHG}$, the flying capacitor 206 is charging at the same rate as the output capacitor 207 being discharged. When the VOUT decreases to a certain level (i.e., the reference voltage 217), the PFM mode comparator 216 generates the PFM clock 215, which triggers the one-shot block 214 to generate the one-shot pulse (single pulse) 213 having a predetermined pulse width (discharging time $T_{DISCHG}$). The one-shot pulse provides, via the buffer 211, a drive signal $V_{Gs1/3}$ at the gate of the power switch 202 or 204 to turn off the power switches 202 are 204 during the pulse width $T_{DISCHG}$, and provides, via the buffer 212, a drive signal $V_{GS2/4}$ at the gate of power the switch 203 or 205 to turn on the power switches 203 and 205 during the pulse width $T_{DISCHG}$. As discussed above, during the one-shot pulse width $T_{DISCHG}$, VOUT is charging and VCfly is discharging. When the one-shot pulse 213 ends, $V_{GS1/3}$ jumps to a higher voltage value that turns on the power switches 202 and 204, and $V_{GS2/4}$ drops to a lower voltage value that turns off the power switches 203 and 205, and the operations during the $T_{CHG}$ starts again.

From FIG. 3, the following facts are observed: (1) the duty cycle is not 50% anymore; (2) the one-shot block 214 generates a single pulse with a pre-determined pulse width; (3) The one-shot block 214 produces a single pulse only when the output voltage decreases to a level such that the voltage at the FB node crosses the reference voltage REF 217.

When the output load current Iout increases, the output voltage VOUT discharging time ($T_{CHG}$) before the PFM mode comparator 216 produces a trigger clock to the one-shot block 214 may be shortened, resulting in higher PFM mode operating frequency as the pulse width of the one-shot pulse is constant. That is, Ts decreases. In other words, there will be more one-shot pulses triggered in a fixed period of time. In some embodiments, when the output load current Iout reaches a certain level such that the output power is much higher than the quiescent power of the PFM mode control block 210 and the switching loss of the power switches of the circuit 200, the switched capacitor converter may be configured to enter the open-loop operation mode by disabling the PFM mode control block 210 and enabling an open-loop operation control block (e.g., a block providing driving signals to the power switches 202-205 to drive the single-phase switched capacitor converter to work in the open-loop mode). Whether the single-phase switched capacitor converter operates in the PFM mode or the open loop mode is determined by the drive signals provided to the single-phase switched capacitor converter.

Whether to enable or disable the PFM mode may be determined by monitoring, e.g., the output load current Iout (or the trailing current ICfly of the flying capacitor 206) or the PFM mode operation frequency (e.g., the length of Ts or $T_{CHG}$). As an example, a control circuit/block may be configured to detect whether Iout exceeds a current threshold or whether Ts is less than a time threshold. If Iout exceeds a pre-determined open-loop operation current threshold or Ts is less than a pre-determined time threshold, a control signal may be generated to disable the PFM mode control block 210, such that no one-shot pulse may be triggered, and to enable the open-loop operation control block (e.g., allowing drive signals from the open-loop operation control block to pass to drive the switched capacitor converter). For example, the control signal may be used to disable the PFM mode comparator 216, or the one-shot block 214, or both, in order to disable the PFM mode control block 210. Those of skilled in the art would readily recognize that the control circuit/block and generation of the control signals to enable/disable the PFM mode and the open-loop mode may be implemented in various ways in order to provide the needed functions. Design of such the control circuit/block is out of scope of this disclosure. The switched capacitor converter then exits the PFM mode and enters the open-loop mode. When Iout is less than the pre-determined PFM operation current threshold, a control signal may be generated to enable the PFM mode control block 210 and disable the open-loop operation control block, such that the switched capacitor converter can operate in the PFM mode. Iout may vary based on the system loads. When the system is lightly loaded or has no load, the PFM is enabled. Similar control circuits/blocks and control signals may be used to control the switched capacitor converter to switch between operating in the PFM mode and operating in the open-loop modes when ICfly, Ts, or $T_{CHG}$ is used.

Figure 4:
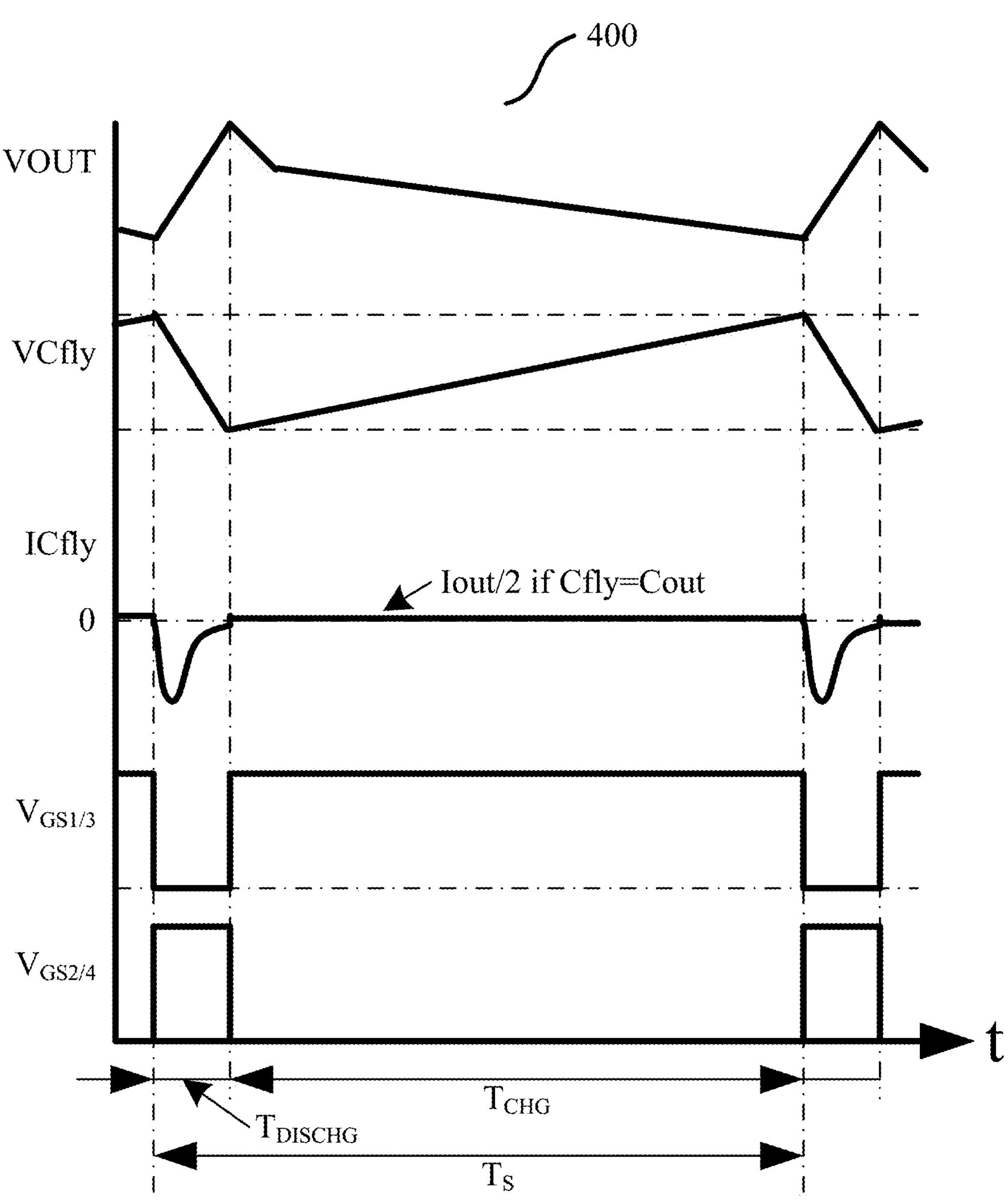
FIG. 4 is a diagram illustrating waveforms of the circuit in FIG. 2 when operating in a PFM mode.

FIG. 4 is a diagram 400 showing waveforms of the circuit 200 in FIG. 2 when operating in the PFM mode. FIG. 4 shows waveforms of the voltage VOUT, the voltage VCfly across the flying capacitor 206, the voltage $V_{Gs1/3}$ at the power switch 202 or 204, and the voltage $V_{GS2/4}$ at the power switch 203 or 205, in one cycle Ts. These waveforms are similar to those illustrated in FIG. 3. Specifically, FIG. 4 also shows a waveform of the current ICfly flowing through the flying capacitor 206 during the PFM mode operation of the switched capacitor converter. As mentioned before, the current through the flying capacitor 206 during the first time interval ($T_{CHG}$ is given by ICfly/ICout=C207/C206 or ICfly/ICout=Cout/Cfly). Cfly represents the capacitance of the flying capacitor 206, and Cout represents the capacitance of the output filtering capacitor 207. The sum of ICfly and ICout is equal to the output load current Iout. The following equation can be derived:

$$ICfly = Iout/(1 + Cfly/Cout) \tag{1}$$

If the flying capacitor 206 and the output filtering capacitor 207 have the same capacitance, then based on equation (1), ICfly=Iout/2. When the one-shot pulse 213 is triggered, the power switches 202 and 204 are turned off and the power switches 230 and 205 are turned on, and there will be an abrupt decrease in ICfly as the flying capacitor 206 starts discharging when the one-shot pulse ($T_{DISCHG}$) starts.

Figure 5:
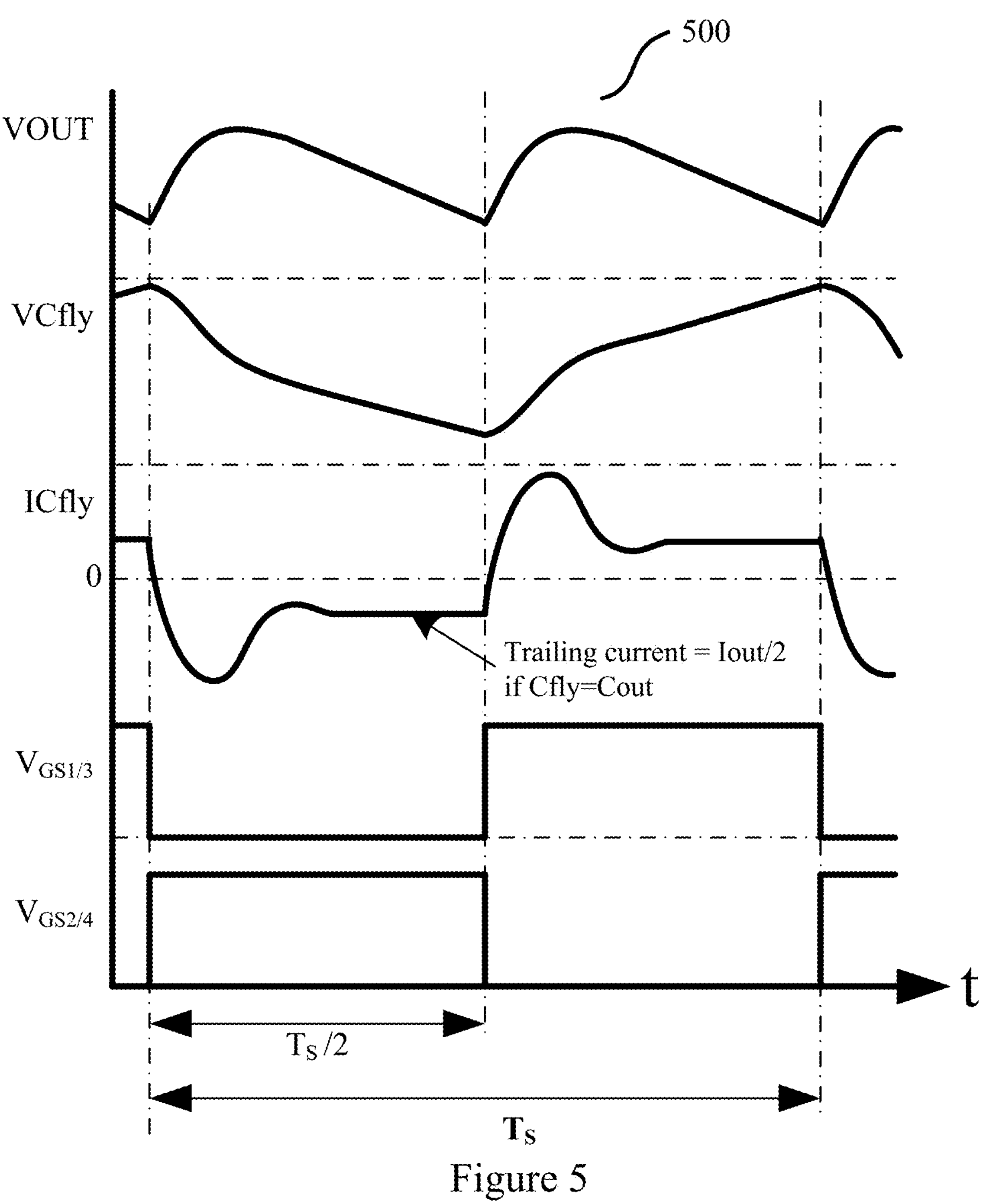
FIG. 5 is a diagram illustrating waveforms of the circuit in FIG. 2 when operating in an open-loop mode.

FIG. 5 is a diagram 500 illustrating waveforms of the voltage VOUT, the voltage VCfly across the flying capacitor 206, the current ICfly of the flying capacitor 206, the voltage $V_{GS1/3}$ at the power switch 202 or 204, and the voltage $V_{Gs2/4}$ at the power switch 203 or 205 during the open-loop mode operation at heavy load conditions. As discussed above, when the load is heavy, the output load current may be greater than the threshold, and the switched capacitor converter may be controlled to operate in the open-loop mode. As shown, the power switches 202-205 in this case are operating in a 50% duty cycle during a period Ts.

It is noted that before the end of the operation cycle (the end of Ts), the current value ICfly of the flying capacitor 206 is governed by equation (1) because the voltage across the flying capacitor 206 is linearly charged, and after the transition (after the one-shot pulse is triggered), the energy built up on the flying capacitor 206 finishes. Therefore, the current ICfly through the flying capacitor 206 right before the power switches 202 and 204 are turned off may be used as a condition to enter or exit from the PFM mode operation. As an example, an appropriate current threshold may be set and used to monitor the current ICfly through the flying capacitor 206, e.g., one can decide to enter the PFM mode operation when the ICfly is less than 0.5A, and to exit (or disable) the PFM mode operation when the ICfly is 0.6A. Note that a 100 mA hysteresis may be added to avoid the chattering between the operation modes due to noise in real world.

Similar to those discussed previously, a control block may be provided to monitor the current ICfly through the flying capacitor 206 against a current threshold. If the current ICfly exceeds the current threshold, a control signal may be generated to control the switched capacitor converter to operate in the open-loop mode, by disabling the PFM mode control block 210 and enabling the open-loop operation control block. If ICfly then becomes less than the current threshold, a control signal may be generated to control the switched capacitor converter to operate in the PFM mode, by enabling the PFM mode control block 210 and disabling the open-loop operation control block.

Figure 6:
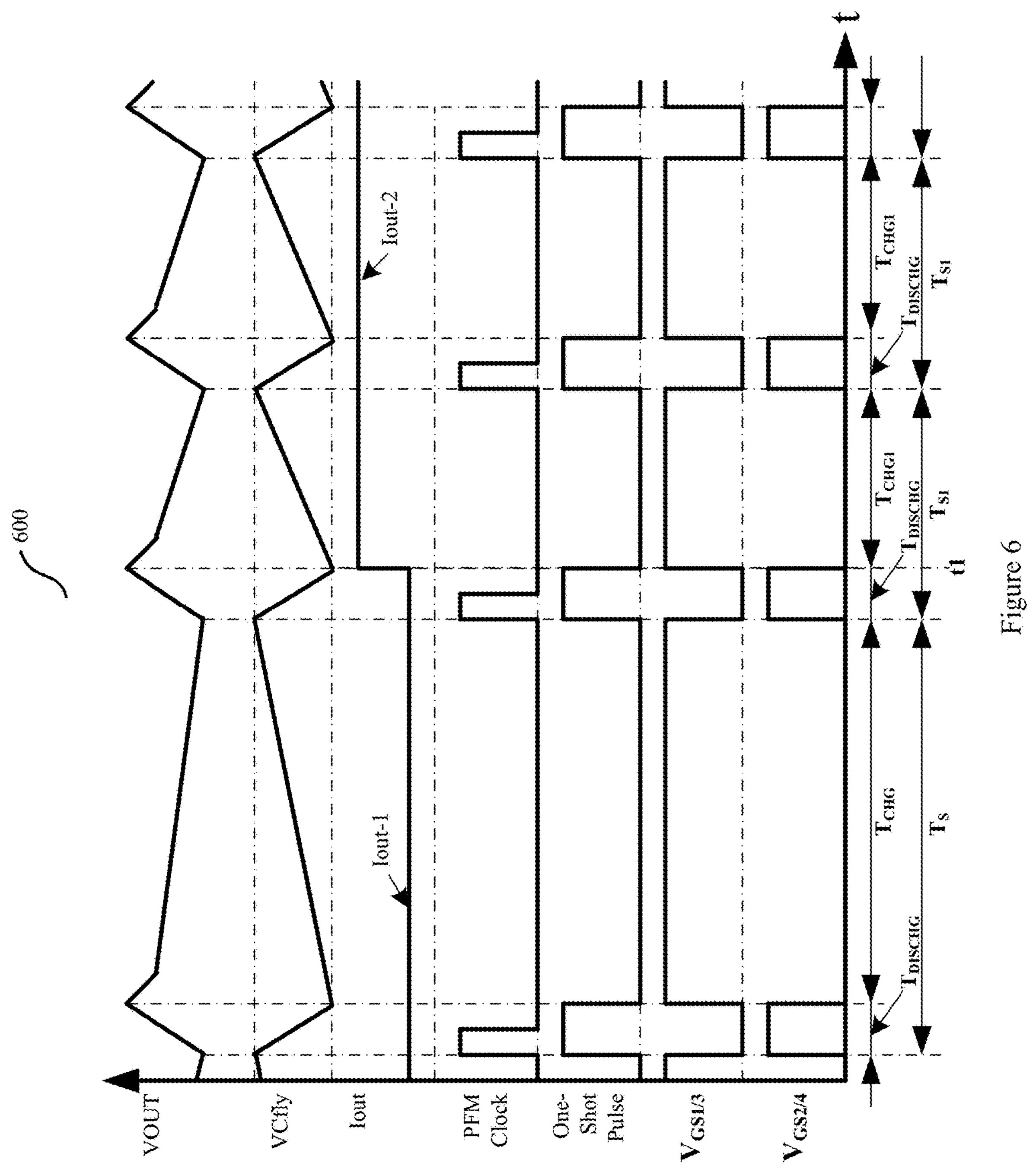
FIG. 6 is a diagram illustrating waveforms of the circuit in FIG. 2, highlighting a relationship between a PFM mode operation frequency and an output load current of the single-phase switched capacitor converter.

FIG. 6 is a diagram 600 illustrating waveforms of the voltage VOUT, the voltage VCfly across the flying capacitor 206, the output load current Iout, the PFM clock 215, the one-shot pulse 213, the voltage $V_{Gs1/3}$ at the power switch 202 or 204, and the voltage $V_{GS2/4}$ at the power switch 203 or 205, in the PFM mode operation. FIG. 6 shows that the PFM mode operating frequency changes when the output load current Iout changes. As the output load current Iout jumps from a lower value Iout-1 to a higher value Iout-2 at t1, the PFM mode operating frequency increases. As shown, when the Iout is Iout-1, the charging time is $T_{CHG}$ and the cycle period is Ts. When Iout increases to Iout-2, the charging time decreases and becomes $T_{CHG1}<T_{CHG}$, and the cycle period becomes Ts1<Ts. The one-shot pulse width is the same.

Therefore, the PFM mode operating frequency may be used to determine whether or not to exit the PFM mode operation, e.g., by monitoring the charging time duration ($T_{CHG}$, $T_{CHG1}$) during which the power switches 202 and 204 are on, or monitoring the cycle period Ts. For example, the charging time of the flying capacitor 206 may be monitored, and based on the charging time, the switched capacitor converter may be controlled to operate in the PFM mode or the open-loop mode as described above. As an example, when the charging time duration is less than a pre-determined threshold, the switched capacitor converter exits the PFM mode operation and enters the open-loop mode operation.

Figure 7:
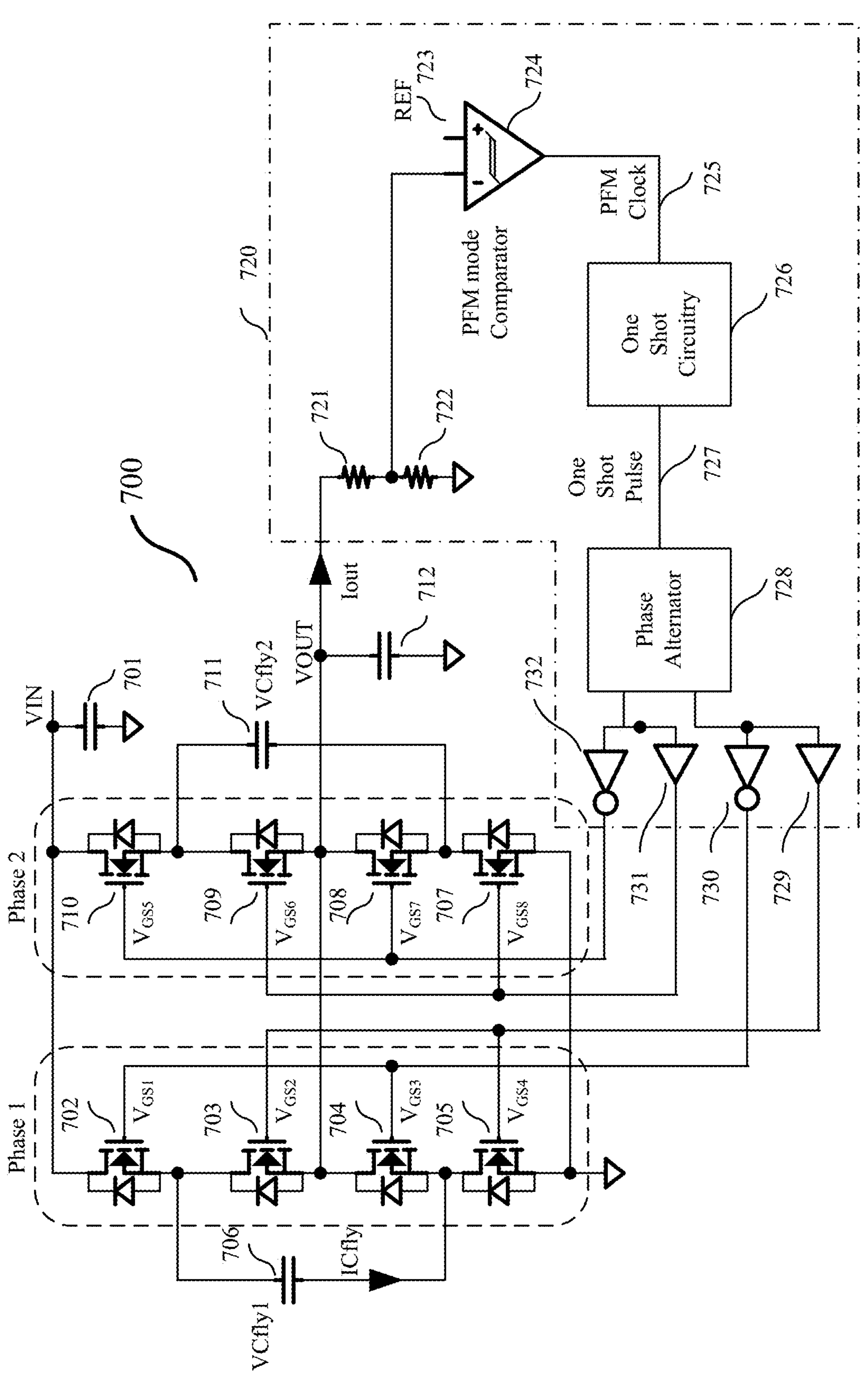
FIG. 7 illustrates a diagram of another circuit, highlighting a control circuit controlling a dual-phase switched capacitor converter to operate in the PFM mode, according to various embodiments of the present disclosure.

The embodiments described above may also be applied to a dual-phase switched capacitor converter. FIG. 7 is a diagram illustrating an embodiment circuit 700, highlighting a dual-phase switched capacitor converter operable in the PFM mode. The circuit 700 includes two subsystems: a dual-phase switched capacitor converter and a PFM mode operation control block 720. The dual-phase switched capacitor converter includes two phases: phase 1 and phase 2.

The dual-phase switched capacitor converter includes an input filter capacitor 701, power switches 702, 703, 704, 705 of phase 1, a flying capacitor 706 of phase 1, power switches 707, 708, 709, 710 of phase 2, a flying capacitor 711 of phase 2, and an output filtering capacitor 712.

The input filter capacitor 701 is connected between a first voltage bus VIN and ground. The phase 1 power switches 702, 703, 704, 705 are connected between the first voltage bus VIN and ground. The phase 1 flying capacitor 706 is connected between a common node of the switches 702 and 703 and a common node of the switches 704 and 705.

The phase 2 power switches 707, 708, 709, 710 are connected between the first voltage bus VIN and ground. The phase 2 flying capacitor 711 is connected between a common node of the switches 709 and 710 and a common node of switches 707 and 708. The output filtering capacitor 712 is connected between a second voltage bus VOUT and ground.

In open-loop operation, the two phases operate in 180 degree output phase mode with a fixed frequency. In PFM mode operation, the two phases operate in 180 degree output phase mode, but the operation frequency varies based on output load current.

The PFM mode operation control block 720 includes components similar to those of the PFM mode operation control block 210 in FIG. 2. As shown, the PFM mode operation control block 720 includes a feedback resistor divider including resistors 721 and 722, a PFM hysteresis comparator (PFM mode comparator) 724, a one-shot signal generator (one-shot circuitry) 726, and power switched drivers 729 to 732. The PFM mode operation control block 720 further includes a phase alternator 728, which alternates driving signals for the PFM mode to each phase of the dual-phase switched capacitor converter. The two phases are alternately driven so that the flying capacitors 706 and 711 each have an appropriate voltage for operating in the open-loop mode when transitioning from the PFM mode to the open-loop mode.

The resistors 721 and 722 are connected in series between the second voltage bus VOUT and ground. A common node of the resistors 721 and 722 is connected to a first input terminal of the PFM mode comparator 724, providing an input voltage to the PFM mode comparator 724. A second input terminal of the PFM mode comparator 724 is connected to a reference voltage (REF) 723.

The PFM mode operation control block 720 operates similarly to the PFM mode operation control block 210. The PFM mode comparator 724 generates a PFM clock 725 based on the input voltage and the reference voltage 723, and feeds the PFM clock 725 to the one-shot circuitry 726, to trigger the one-shot circuitry 726 to generate a one-shot pulse 727. Different from the PFM mode operation control block 210 in FIG. 2, in this example, the one-shot circuitry 726 feeds the one-shot pulse 727 to the phase alternator 728, by which, the one-shot pulse 727 is alternately sent to drive the two phases of the dual-phase switched capacitor converter.

As shown, a first output terminal of the phase alternator 728 is connected to a non-inverting buffer 729 and an inverting buffer 730. The inverting buffer 730 is connected to respective terminals of the phase 1 power switches 702 and 704. The non-inverting buffer 729 is connected to respective terminals of the phase 1 power switches 703 and 705. The output of the non-inverting buffer 729 drives the power switches 703 and 705. The output of the inverting buffer 730 drives the power switches 702 and 704.

A second output terminal of the phase alternator 728 is connected to a non-inverting buffer 731 and an inverting buffer 732. The inverting buffer 732 is connected to respective terminals of the phase 2 power switches 708 and 710. The non-inverting buffer 731 is connected to respective terminals of the phase 2 power switches 707 and 709. The output of the non-inverting buffer 731 drives the power switches 707 and 709. The output of the inverting buffer 732 drives the power switches 708 and 710.

Figure 8:
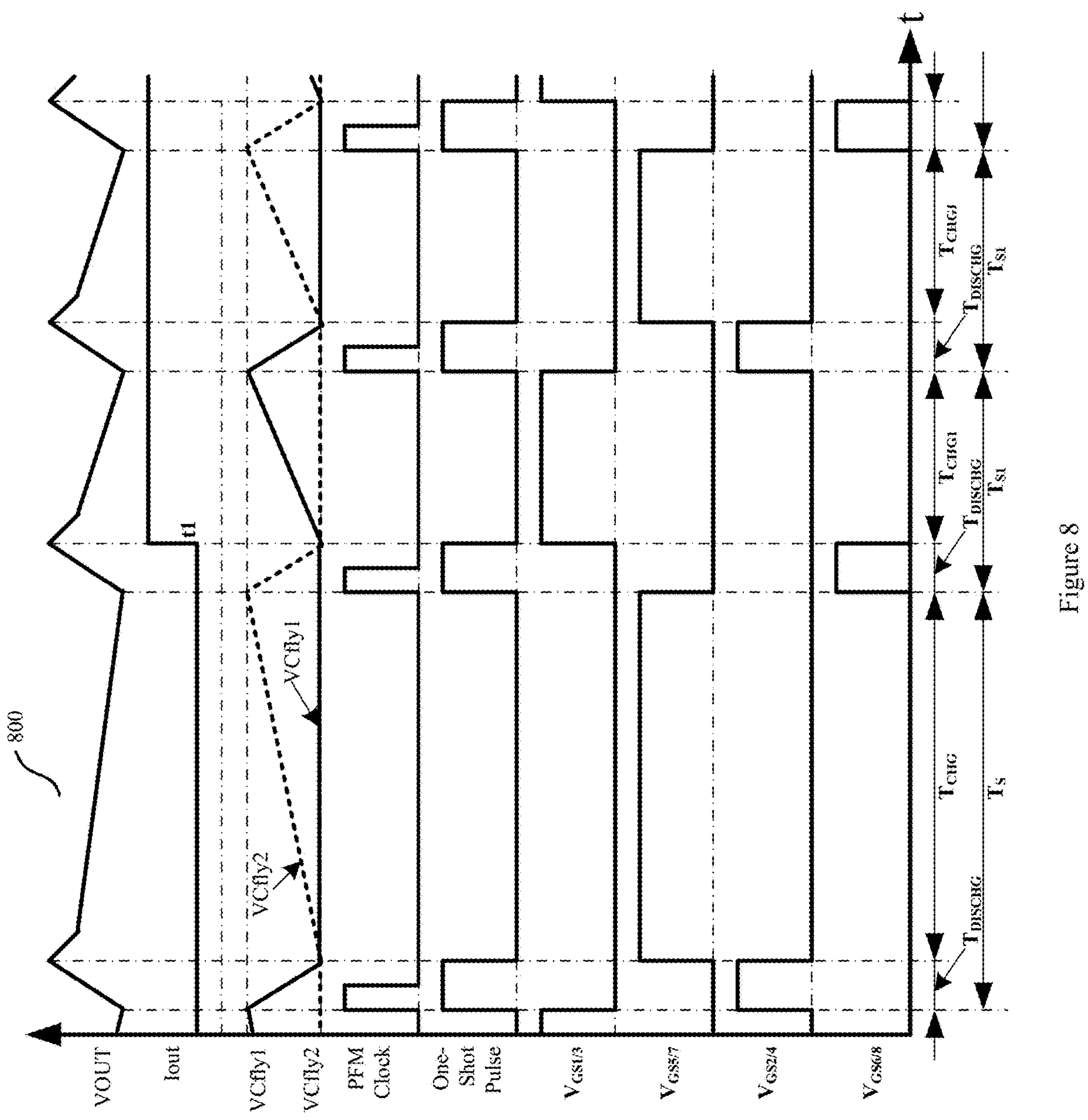
FIG. 8 is a diagram illustrating waveforms of the circuit in FIG. 7, highlighting a relationship between a PFM mode operation frequency and an output load current of the dual-phase switched capacitor converter.

FIG. 8 is a diagram 800 illustrating waveforms of the circuit in FIG. 7, including waveforms of the voltage VOUT, the voltage VCfly1 (solid line) across the flying capacitor 706, the voltage VCfly2 (dash line) across the flying capacitor 711, the output load current Iout, the PFM clock 725, the one-shot pulse 727, the voltage $V_{Gs1/3}$ at the power switch 702 or 704, and the voltage $V_{GS2/4}$ at the power switch 703 or 705, the voltage $V_{GS5/7}$ at the power switch 708 or 710, and the voltage $V_{Gs6/8}$ at the power switch 707 or 709, in the PFM mode operation. FIG. 8 shows that the PFM mode operating frequency changes when the output load current Iout changes. As the output load current Iout jumps from to a higher value at t1, the PFM mode operating frequency increases, the charging time decreases from $T_{CHG}$ to $T_{CHG1}$, and the cycle period decreases from Ts to Ts1. The one-shot pulse width is the same.

Figure 9:
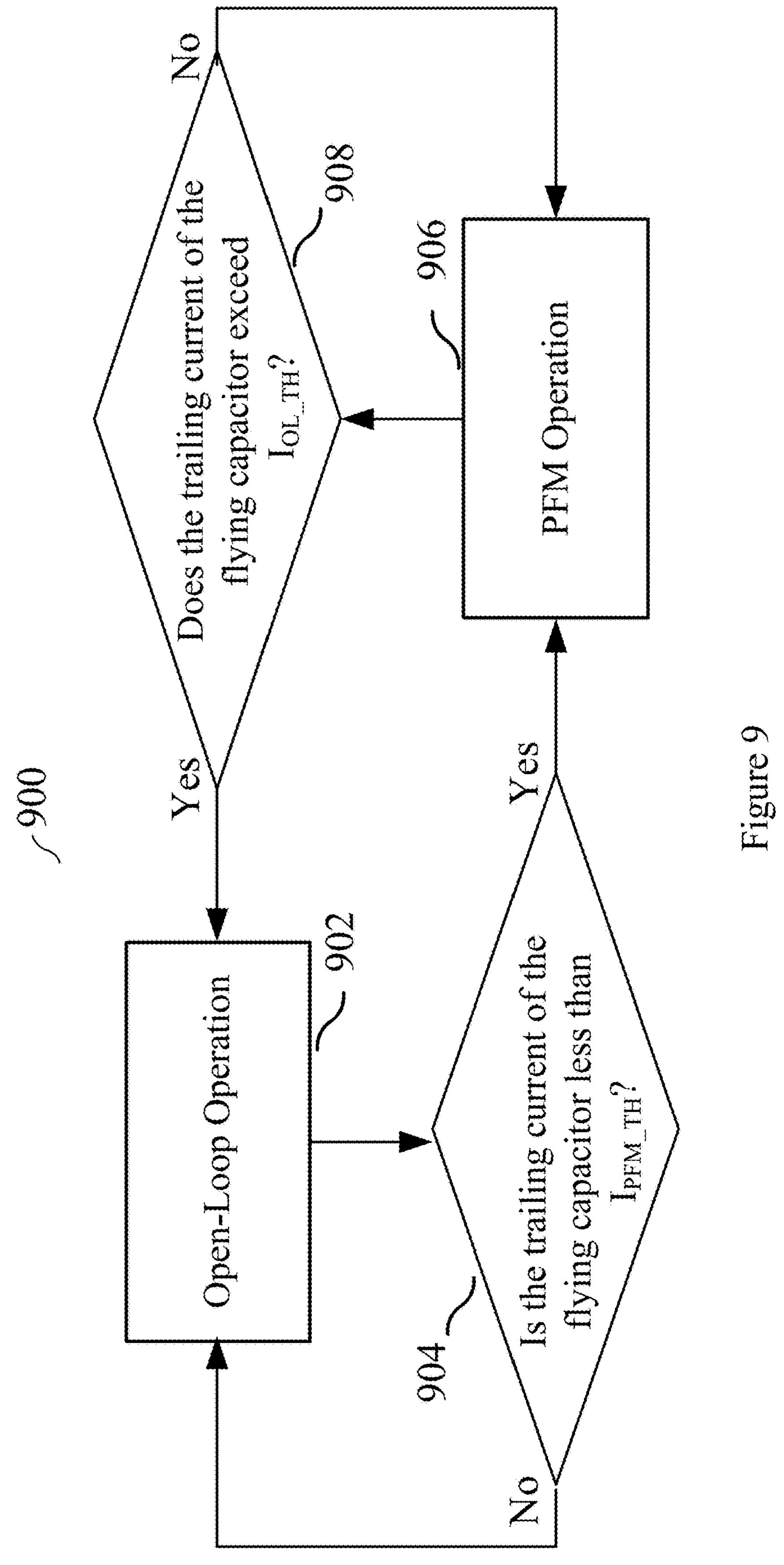
FIG. 9 is a flow diagram of a control method for PFM mode operation of a switched capacitor converter according to various embodiments of the present disclosure.

FIG. 9 illustrates a flow diagram of an embodiment method 900 for controlling the PFM mode operation of a switched capacitor converter. The method 900 may be used to determine whether to control the switched capacitor converter to enter or exit the PFM mode and whether to enter or exit the open-loop mode. In an example, when the switched capacitor converter is operating in the PFM mode, the method 900 may be used to determine whether the switched capacitor converter continues to operate in the PFM mode, or to exit the PFM mode and switch to the open-loop mode. In another example, when the switched capacitor converter is operating in the open-loop mode, the method 900 may be used to determine whether the switched capacitor converter continues to operate in the open-loop mode, or to switch to the PFM mode.

The method 900 may begin with, as an example, the switched capacitor converter operating in the open-loop mode (block 902). A trailing current flowing through a flying capacitor of the switched capacitor converter is monitored, e.g., constantly or periodically. The method 900 detects whether the trailing current of the flying capacitor is less than a first current threshold $I_{PFM\_TH}$ (block 904). The first current threshold $I_{PFM\_TH}$ may be a pre-determined current threshold used to determine whether to switch from the open-loop mode to the PFM mode. When the trailing current of the flying capacitor is not less than $I_{PFM\_TH}$, the method 900 proceeds back to block 902, and the switched capacitor converter may continue to operate in the open-loop mode operation. When the trailing current of the flying capacitor is less than $I_{PFM\_TH}$, the method 900 proceeds to block 906, where the switched capacitor converter is controlled to operate in the PFM operation (block 906). The switched capacitor converter switches from the open-loop mode to the PFM mode. For example, a control signal may be generated to enable a PFM mode operation control block, e.g., block 210 or 720, which drives the switched capacitor converter to operate in the PFM mode.

While operating in the PFM mode, the trailing current of the flying capacitor of the switched capacitor converter is also monitored, e.g., constantly or periodically. The method 900 detects whether the trailing current flowing through the flying capacitor of the switched capacitor converter exceeds a second threshold $I_{OL\_TH}$ (block 908). The second threshold $I_{OL\_TH}$ may be a pre-determined current threshold used to determine whether to switch from the PFM mode to the open-loop mode. When detecting that the trailing current of the flying capacitor does not exceed $I_{OL\_TH}$, the method 900 proceeds back to block 906, and the switched capacitor converter may continue to operate in the PFM mode. When detecting that the trailing current of the flying capacitor exceeds $I_{OL\_TH}$, the method 900 proceeds to block 902, and the switched capacitor converter is controlled to operate in the open-loop mode. The switched capacitor converter switches from the PFM mode to the open-loop mode. For example, a control signal may be generated to disable the PFM mode operation control block, e.g., block 210 or 720, and enable an open-loop mode operation block, which drives the switched capacitor converter to operate in the open-loop mode.

The flying capacitor is coupled between a first common node of first two switches of the switched capacitor converter and a second common node of second two switches of the switched capacitor converter, and the first two switches and the second two switches are connected in series. For example, the flying capacitor may be the flying capacitor 206 in FIG. 2, or the flying capacitor 706 or 711. When the switched capacitor converter is dual phase, the current of a flying capacitor in any of the two phases, e.g., the current of the flying capacitor 706 or 711, may be monitored to determine the operation mode of the switched capacitor converter.

In the embodiment method 900, the trailing current of the flying capacitor of the switched capacitor converter is detected/monitored to determine whether to switch from the PFM mode to the open-loop mode. As another embodiment, the output current of the switched capacitor converter may be used, in place of the trailing current of the flying capacitor of the switched capacitor converter, to determine whether to switch from the PFM mode to the open-loop mode in the method 900. Using the output current of the switched capacitor converter, instead of the trailing current of the flying capacitor of the switched capacitor converter, is natural as the trailing current of the flying capacitor mainly depends on the output current during either open-loop or PFM operation. In this case, all the steps of the embodiment method 900 may remain the same, but the output current of the switched capacitor converter, instead of the trailing current of the flying capacitor, is detected and compared with two different current thresholds (in block 904 and 908). Since the output current and the trailing current of the flying capacitor of the switched capacitor converter are related to each other, the output current may be measured by monitoring the trailing current of the flying capacitor, and the trailing current of the flying capacitor may also be measured by monitoring the output current.

Figure 10:
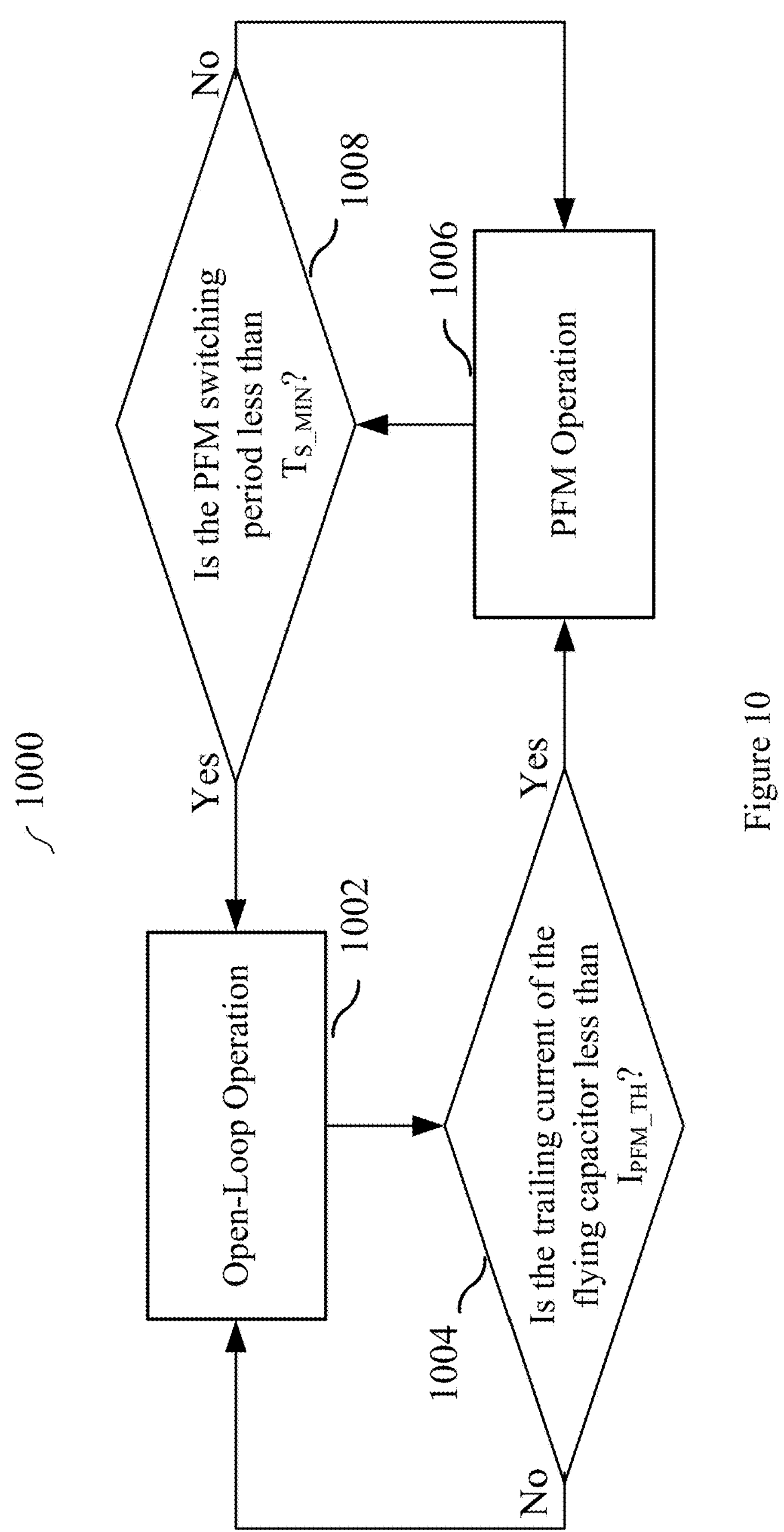
FIG. 10 is a flow diagram of another control method for PFM mode operation of a switched capacitor converter according to various embodiments of the present disclosure.

FIG. 10 illustrates a flow diagram of another embodiment method 1000 for controlling the PFM mode operation of a switched capacitor converter. The method 1000 may be used to determine whether to control the switched capacitor converter to enter or exit the PFM mode and whether to enter or exit the open-loop mode.

The method 1000 may begin with, as an example, the switched capacitor converter operating in the open-loop mode (block 1002). A trailing current flowing through a flying capacitor of the switched capacitor converter is monitored, e.g., constantly or periodically. The flying capacitor is coupled between a first common node of first two switches of the switched capacitor converter and a second common node of second two switches of the switched capacitor converter, and the first two switches and the second two switches are connected in series. For example, the flying capacitor may be the flying capacitor 206 in FIG. 2, or the flying capacitor 706 or 711. When the switched capacitor converter is dual phase, a flying capacitor in any of the two phases, e.g., 706 or 711, may be monitored for its trailing current.

The method 1000 detects whether the trailing current of the flying capacitor is less than a current threshold $I_{PFM\_TH}$ (block 1004). The current threshold $I_{PFM\_TH}$ may be a pre-determined current threshold used to determine whether to switch from the open-loop mode to the PFM mode. When the trailing current of the flying capacitor is not less than $I_{PFM\_TH}$, the method 1000 proceeds back to block 1002, and the switched capacitor converter may continue to operate in the open-loop mode operation. When the trailing current of the flying capacitor is less than $I_{PFM\_TH}$, the method 1000 proceeds to block 1006, where the switched capacitor converter is controlled to operate in the PFM operation (block 1006). The switched capacitor converter switches from the open-loop mode to the PFM mode. For example, a control signal may be generated to enable a PFM mode operation control block, e.g., block 210 or 720, which drives the switched capacitor converter to operate in the PFM mode.

While operating in the PFM mode, a PFM switching period of the PFM mode operation of the switched capacitor converter is monitored, e.g., constantly or periodically. The PFM switching period may be the cycle period Ts in FIG. 3 or FIG. 8. The method 1000 detects whether the PFM switching period is less than a time threshold Ts-MIN (block 1008). The second threshold Ts-MIN may be a pre-determined time duration threshold used to determine whether to switch from the PFM mode to the open-loop mode. When detecting that the PFM switching period does exceed TS-MIN, the method 1000 proceeds back to block 1006, and the switched capacitor converter may continue to operate in the PFM mode. When detecting that the PFM switching period not exceed Ts-MIN, the method 1000 proceeds to block 1002, and the switched capacitor converter is controlled to operate in the open-loop mode. The switched capacitor converter switches from the PFM mode to the open-loop mode. For example, a control signal may be generated to disable a PFM mode operation control block, e.g., block 210 or 720, and enable an open-loop mode operation block, which drives the switched capacitor converter to operate in the open-loop mode.

In the embodiment method 1000, the PFM switching period of the switched capacitor converter is detected/monitored to determine whether to switch from the PFM mode to the open-loop mode. As another embodiment, the time interval, during which a flying capacitor of the switched capacitor converter is charged, may be used, in place of the PFM switching period, to determine whether to switch from the PFM mode to the open-loop mode in the method 1000. The time interval during which the flying capacitor of the switched capacitor converter is charged may be referred to as a charging time interval for the flying capacitor, and may be, e.g., $T_{CHG}$ in FIG. 3 or FIG. 8. Using the charging time interval, instead of the PFM switching period, is natural as Ts mainly depends on $T_{CHG}$ when the one-shot pulse width is fixed. In this case, all the steps of the embodiment method 1000 may remain the same, but the charging time interval for the flying capacitor, instead of the PFM switching period, is detected and compared with a charging time threshold (in block 1008). The flying capacitor may be the flying capacitor 206 in FIG. 2, or the flying capacitor 706 or 711. When the switched capacitor converter is dual phase, a flying capacitor in any of the two phases, e.g., 706 or 711, may be monitored for its charging time interval. Since Ts and $T_{CHG}$ are related to each other, the charging time interval may be measured by monitoring the PFM switching period, and the PFM switching period may be measured by monitoring the charging time interval.

Figure 11:
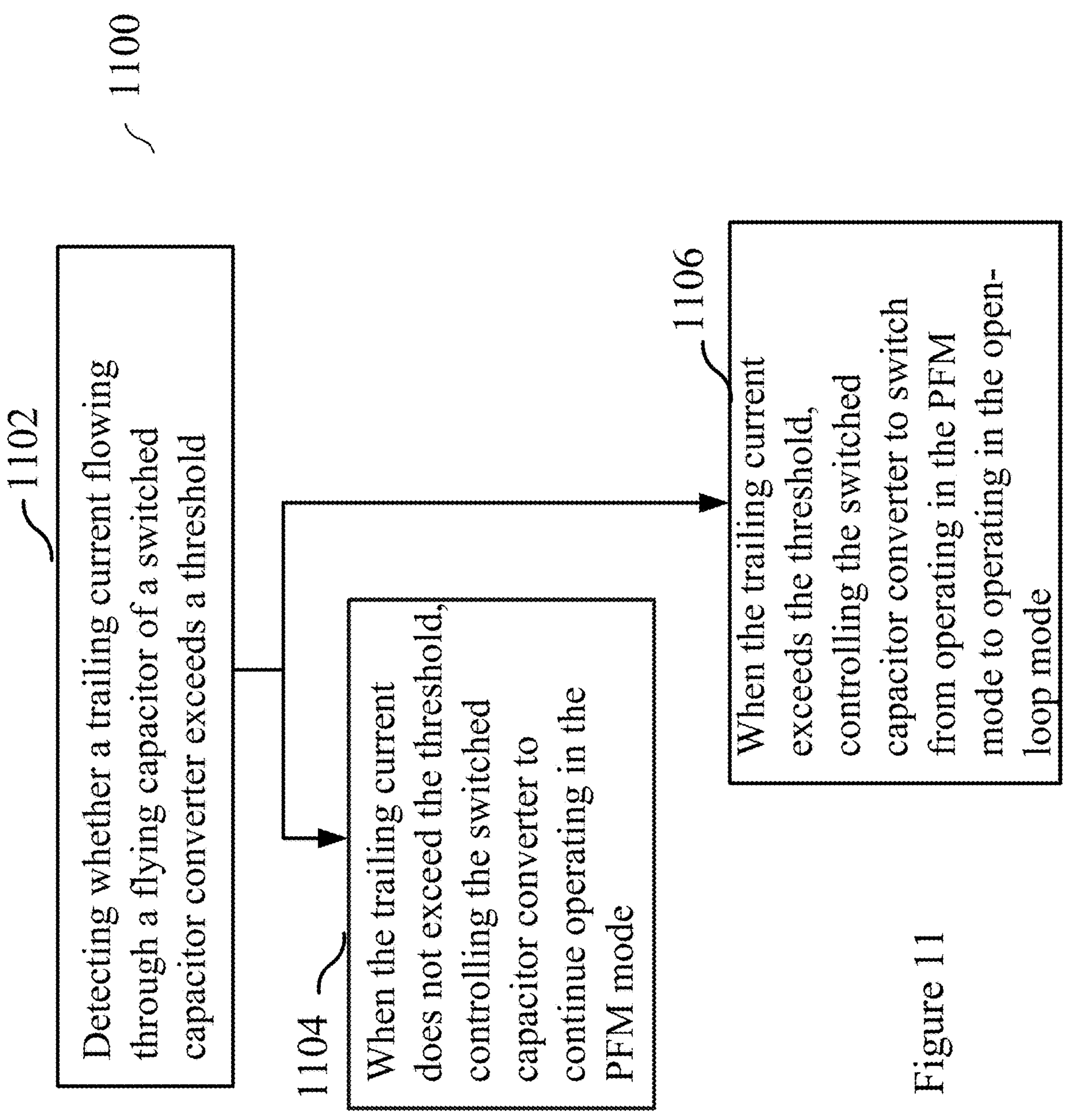
FIG. 11 is a flow diagram of another control method for PFM mode operation of a switched capacitor converter according to various embodiments of the present disclosure.

FIG. 11 illustrates a flow diagram of another embodiment method 1100 for controlling the PFM mode operation of a switched capacitor converter. The method 1100 may be used to determine whether to control the switched capacitor converter to continue operating in the PFM mode or exit the PFM mode. The method 1100 includes detecting whether a trailing current flowing through a flying capacitor of the switched capacitor converter exceeds a threshold (block 1102). The flying capacitor is coupled between a first common node of first two switches of the switched capacitor converter and a second common node of second two switches of the switched capacitor converter, and the first two switches and the second two switches are connected in series. The method 1100 further includes: when the trailing current flowing through the flying capacitor does not exceed the threshold, controlling the switched capacitor converter to continue operating in the PFM mode (block 1104). The method 1100 also includes: when the trailing current flowing through the flying capacitor exceeds the threshold, controlling the switched capacitor converter to switch from operating in the PFM mode to operating in an open-loop mode (block 1106).

Figure 12:
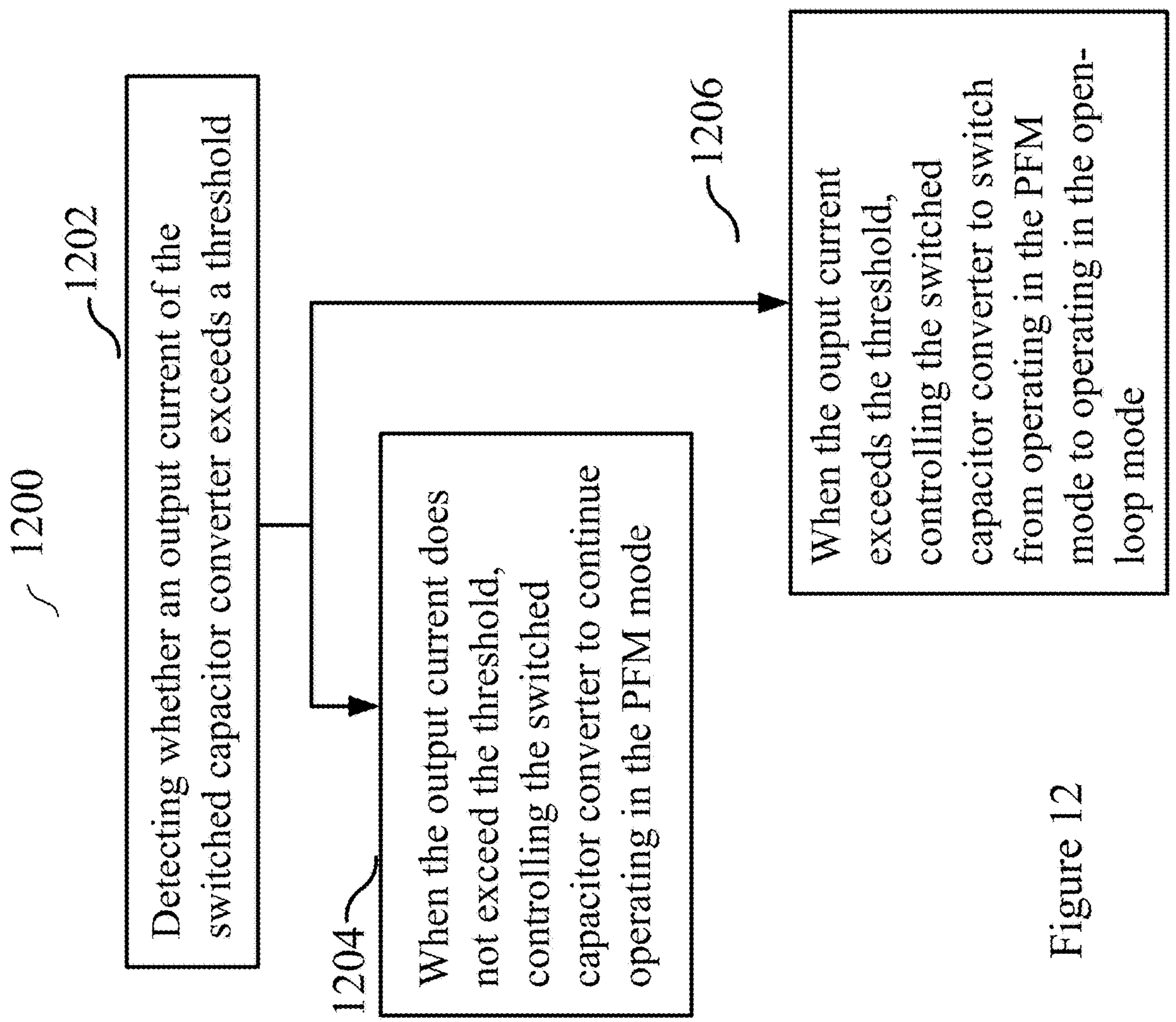
FIG. 12 is a flow diagram of another control method for PFM mode operation of a switched capacitor converter according to various embodiments of the present disclosure.

FIG. 12 illustrates a flow diagram of another embodiment method 1200 for controlling the PFM mode operation of a switched capacitor converter. The method 1200 may be used to determine whether to control the switched capacitor converter to continue operating in the PFM mode or exit the PFM mode. The method 1200 includes detecting whether an output current of the switched capacitor converter exceeds a threshold (block 1202). The method 1200 further includes: when the output current does not exceed the threshold, controlling the switched capacitor converter to continue operating in the PFM mode (block 1204). The method 1100 also includes: when the output current exceeds the threshold, controlling the switched capacitor converter to switch from operating in the PFM mode to operating in an open-loop mode (block 1206).

Figure 13:
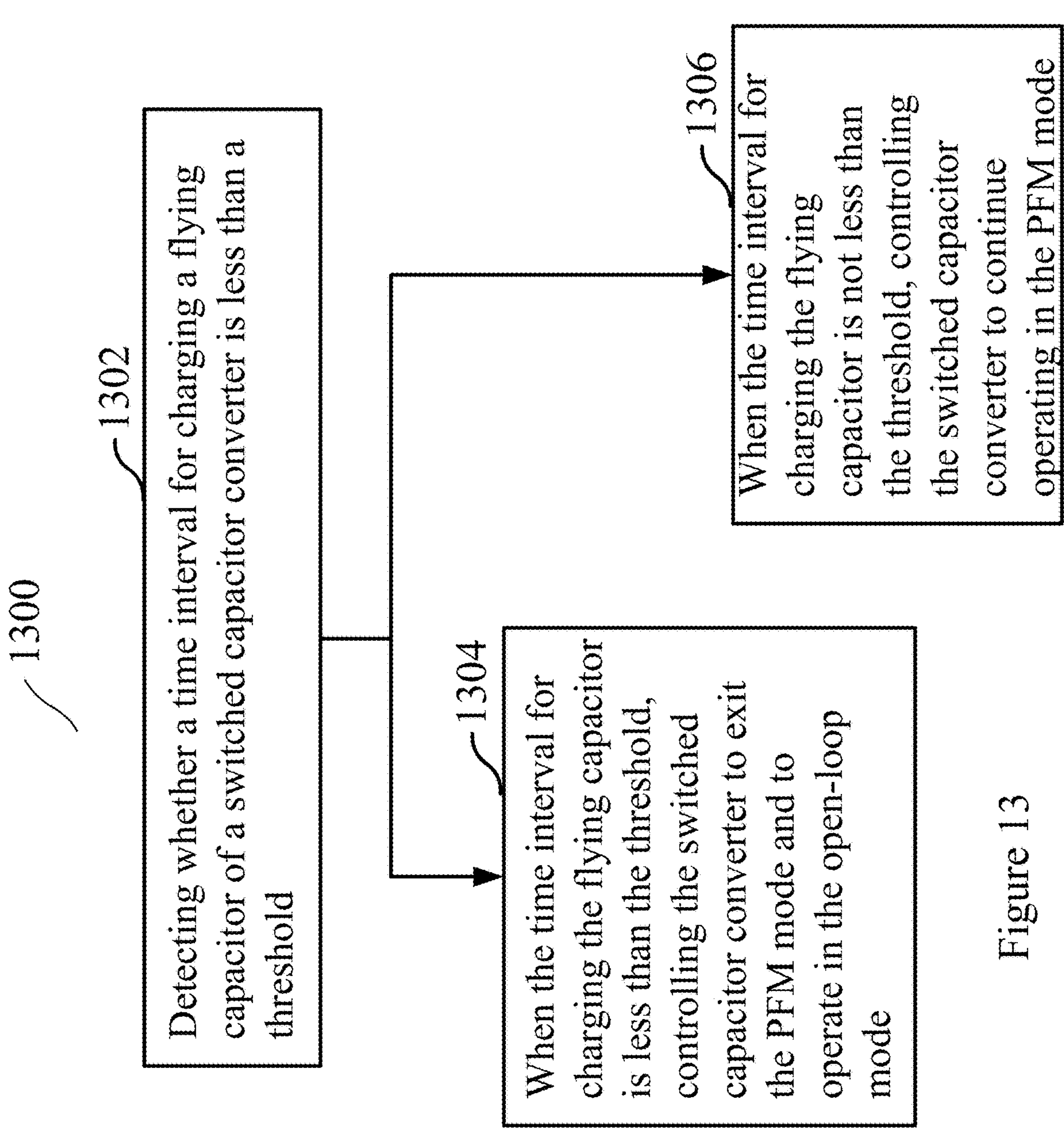
FIG. 13 is a flow diagram of another control method for PFM mode operation of a switched capacitor converter according to various embodiments of the present disclosure.

FIG. 13 illustrates a flow diagram of another embodiment method 1300 for controlling the PFM mode operation of a switched capacitor converter. The method 1300 may be used to determine whether to control the switched capacitor converter to continue operating in the PFM mode or exit the PFM mode. The method 1300 includes: detecting whether a time interval for charging a flying capacitor of the switched capacitor converter is less than a threshold (block 1302). The flying capacitor is coupled between a first common node of first two switches of the switched capacitor converter and a second common node of second two switches of the switched capacitor converter, and the first two switches and the second two switches are connected in series, and wherein the switched capacitor converter is operating in a pulse frequency modulation (PFM) mode. The method 1300 further includes: when the time interval for charging the flying capacitor is less than the threshold, controlling the switched capacitor converter to exit the PFM mode and to operate in the open-loop mode (block 1304). The method 1300 also includes: when the time interval for charging the flying capacitor is not less than the threshold, controlling the switched capacitor converter to continue operating in the PFM mode (block 1306).

Figure 14:
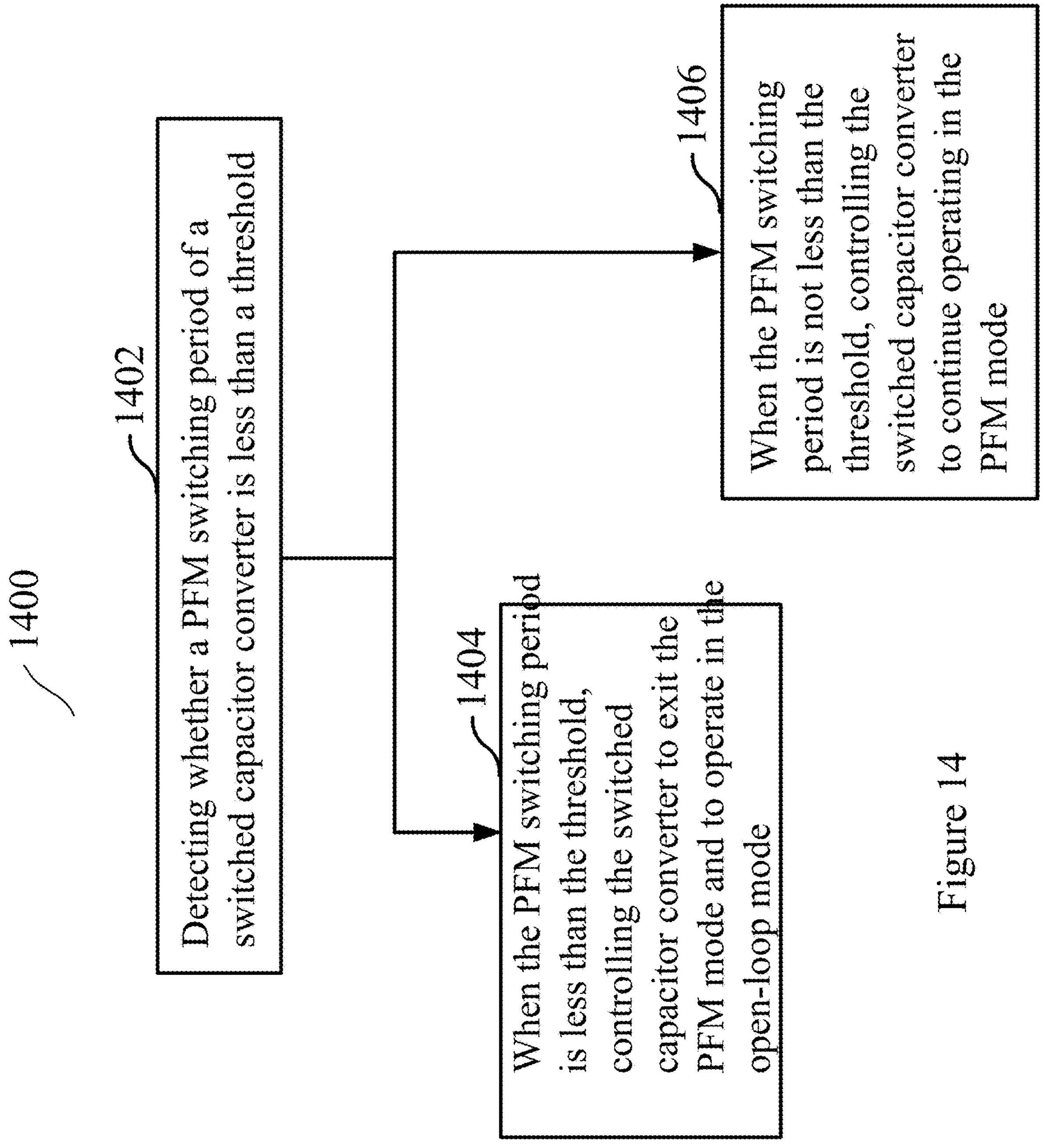
FIG. 14 is a flow diagram of another control method for PFM mode operation of a switched capacitor converter according to various embodiments of the present disclosure.

FIG. 14 illustrates a flow diagram of another embodiment method 1400 for controlling the PFM mode operation of a switched capacitor converter. The method 1400 may be used to determine whether to control the switched capacitor converter to continue operating in the PFM mode or exit the PFM mode. The method 1400 includes: detecting whether a PFM switching period of the switched capacitor converter is less than a threshold (block 1402). The method 1400 further includes: when the PFM switching period is less than the threshold, controlling the switched capacitor converter to exit the PFM mode and to operate in the open-loop mode (block 1404). The method 1400 also includes: when the PFM switching period is not less than the threshold, controlling the switched capacitor converter to continue operating in the PFM mode (block 1406).

The embodiments shown in FIGS. 9-14 are merely examples, which should not unduly limit the scope of the claims. One of ordinary skill in the art would recognize many variations, alternatives, and modifications. For example, various steps illustrated in any one of FIGS. 9-10 may be removed, replaced, rearranged and repeated, and other applicable steps may be added.

The embodiments described above may be applied in a battery charging system, e.g., the charging system 100 in FIG. 1, configured to charge batteries with two or more battery cells, or may be applied in any other applicable scenarios. The embodiment circuit 200 in FIG. 2 or the circuit 700 in FIG. 7 may be implemented as an integrated circuit configured to be mounted on a printed circuit board (PCB), which may be a part of a device, such as a mobile device.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed is:

1. A method comprising:

detecting, when a switched capacitor converter operates in a pulse frequency modulation (PFM) mode, whether a trailing current flowing through a flying capacitor of the switched capacitor converter exceeds a threshold, wherein, the flying capacitor is coupled between a common node of a first switch and a second switch and a common node of a third switch and a fourth switch of the switched capacitor converter, a common node of the second switch and the third switch is an output node of the switched capacitor converter, the switched capacitor converter is configured to turn on or off the first switch and the third switch alternately with the second switch and the fourth switch, to deliver current to an output capacitor of the switched capacitor converter without passing through an inductor, the output capacitor being directly connected to the output node, and the trailing current is a current flowing through the flying capacitor before the first and third switches are turned off; and when the trailing current does not exceed the threshold, controlling the switched capacitor converter to continue operating in PFM mode; and when the trailing current exceeds the threshold, controlling the switched capacitor converter to switch from operating in the PFM mode to operating in an open-loop mode.

2. The method of claim 1, further comprising:

when the switched capacitor converter operates in the open-loop mode, configuring the first switch, the second switch, the third switch and the fourth switch of the switched capacitor converter to turn on and off at a fixed frequency and with a 50% duty cycle.

3. The method of claim 1, further comprising:

when the switched capacitor converter operates in the PFM mode, generating a one-shot pulse to cause the second switch and the fourth switch of the switched capacitor converter to turn on, and to cause the flying capacitor to directly charge, without using an inductor, the output capacitor at the output node of the switched capacitor converter for a pre-determined duration.

4. The method of claim 3, wherein detecting whether the trailing current flowing through the flying capacitor of the switched capacitor converter exceeds the threshold comprises:

detecting whether an output current of the switched capacitor converter exceeds an output current threshold.

5. The method of claim 3, wherein the pre-determined duration is a pulse width of the one-shot pulse.

6. The method of claim 5, further comprising:

determining the pulse width of the one-shot pulse based on an output ripple voltage of the switched capacitor converter.

7. A method comprising:

detecting, when a switched capacitor converter operates in an open-loop mode, whether a trailing current flowing through a flying capacitor of the switched capacitor converter is below a threshold, wherein, the flying capacitor is coupled between a common node of a first switch and a second switch and a common node of a third switch and a fourth switch of the switched capacitor converter, a common node of the second and the third switch is an output node of the switched capacitor converter, the switched capacitor converter is configured to turn on or off the first switch and the third switch alternately with the second switch and the fourth switch, to deliver current to an output capacitor of the switched capacitor converter without passing through an inductor, the output capacitor directly connected to the output node, and the trailing current is a current flowing through the flying capacitor before the first and third switches are turned off; and when the trailing current is not below the threshold, controlling the switched capacitor converter to continue operating in the open-loop mode; and when the trailing current is below the threshold, controlling the switched capacitor converter to switch from operating in the open-loop mode to operating in a pulse frequency modulation (PFM) mode.

8. The method of claim 7, further comprising:

when the switched capacitor converter operates in the open-loop mode, configuring the first switch, the second switch, the third switch and the fourth switch of the switched capacitor converter to turn on and off at a fixed frequency and with a 50% duty cycle.

9. The method of claim 7, further comprising:

when the switched capacitor converter operates in the PFM mode, generating a one-shot pulse to cause the second and the fourth switches of the switched capacitor converter to turn on and to cause the flying capacitor to directly charge, without using an inductor, the output capacitor at the output node of the switched capacitor converter for a pre-determined duration.

10. The method of claim 9, wherein detecting whether the trailing current flowing through the flying capacitor of the switched capacitor converter is below the threshold comprises:

detecting whether an output current of the switched capacitor converter is below an output current threshold.

11. The method of claim 9, wherein the pre-determined duration is a pulse width of the one-shot pulse.

12. The method of claim 11, further comprising:

determining the pulse width of the one-shot pulse based on an output ripple voltage of the switched capacitor converter.

* * * * *